(12) United States Patent
Peddada et al.

(10) Patent No.: US 11,489,828 B2
(45) Date of Patent: Nov. 1, 2022

(54) TENANT AWARE MUTUAL TLS AUTHENTICATION

(71) Applicant: salesforce.com, inc., San Francisco, CA (US)

(72) Inventors: Prasad Peddada, Alameda, CA (US); Taher Elgamal, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 41 days.

(21) Appl. No.: 17/112,525

(22) Filed: Dec. 4, 2020

(65) Prior Publication Data

US 2022/0182374 A1    Jun. 9, 2022

(51) Int. Cl.
*H04L 29/06*   (2006.01)
*H04L 9/40*    (2022.01)

(52) U.S. Cl.
CPC ...... *H04L 63/0823* (2013.01); *H04L 63/0807* (2013.01); *H04L 63/105* (2013.01); *H04L 63/108* (2013.01); *H04L 63/126* (2013.01); *H04L 63/166* (2013.01)

(58) Field of Classification Search
CPC ............ H04L 63/0823; H04L 63/0807; H04L 63/105; H04L 63/108; H04L 63/126; H04L 63/166; H04L 9/3247; H04L 9/3265; H04L 9/3273; H04L 63/0869; H04L 63/10; H04L 67/563
See application file for complete search history.

(56) References Cited

U.S. PATENT DOCUMENTS

| | | | |
|---|---|---|---|
| 7,127,607 B1 * | 10/2006 | Su | H04L 9/3263 713/170 |
| 10,958,662 B1 * | 3/2021 | Sole | H04L 63/0853 |
| 2014/0047542 A1 * | 2/2014 | Holloway | H04L 63/1433 726/23 |
| 2014/0280595 A1 | 9/2014 | Mani et al. | |
| 2019/0228144 A1 | 7/2019 | Kermes et al. | |

OTHER PUBLICATIONS

Campbell; Brian, OAuth 2.0 Mutual-TLS Client Authentication and Certificate-Bound Access Tokens, Internet Engineering Task Force, Feb. 29, 2020, pp. 1-14, Internet Engineering Task Force, United States of America.

* cited by examiner

*Primary Examiner* — Amie C. Lin
(74) *Attorney, Agent, or Firm* — Holland & Hart LLP

(57) ABSTRACT

A service may leverage a mutual transport layer security (mTLS) service to authenticate a client that is configured with a client certificate chain. The client may request access to the service, and the service may transmit a redirection response to the client. The redirection response may indicate an endpoint for the mTLS service that is associated with the tenant. In response to receiving the redirection response, the client may perform a digital handshake with the mTLS service, and the mTLS service may validate the client digital certificate and digitally sign the client digital certificate. The mTLS may transmit a redirection response, which redirects the client to the service where the client presents an indication of the digitally signed digital certificate chain. The service may validate the chain of trust associated with the digitally signed digital certificate chain and issue an indication that the client is authenticated to access the service.

20 Claims, 14 Drawing Sheets

TENANT AWARE MUTUAL TLS AUTHENTICATION

FIELD OF TECHNOLOGY

The present disclosure relates generally to database systems and data processing, and more specifically to tenant aware mutual transport layer security (mTLS) authentication.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Various cryptographic protocols and techniques may support authentication to various systems. These techniques may support privacy and data integrity. In some cases, these techniques use digital certificates that support a chain of trust between the certificate issuer and the party that possesses these certificates.

DETAILED DESCRIPTION

Figure 1:
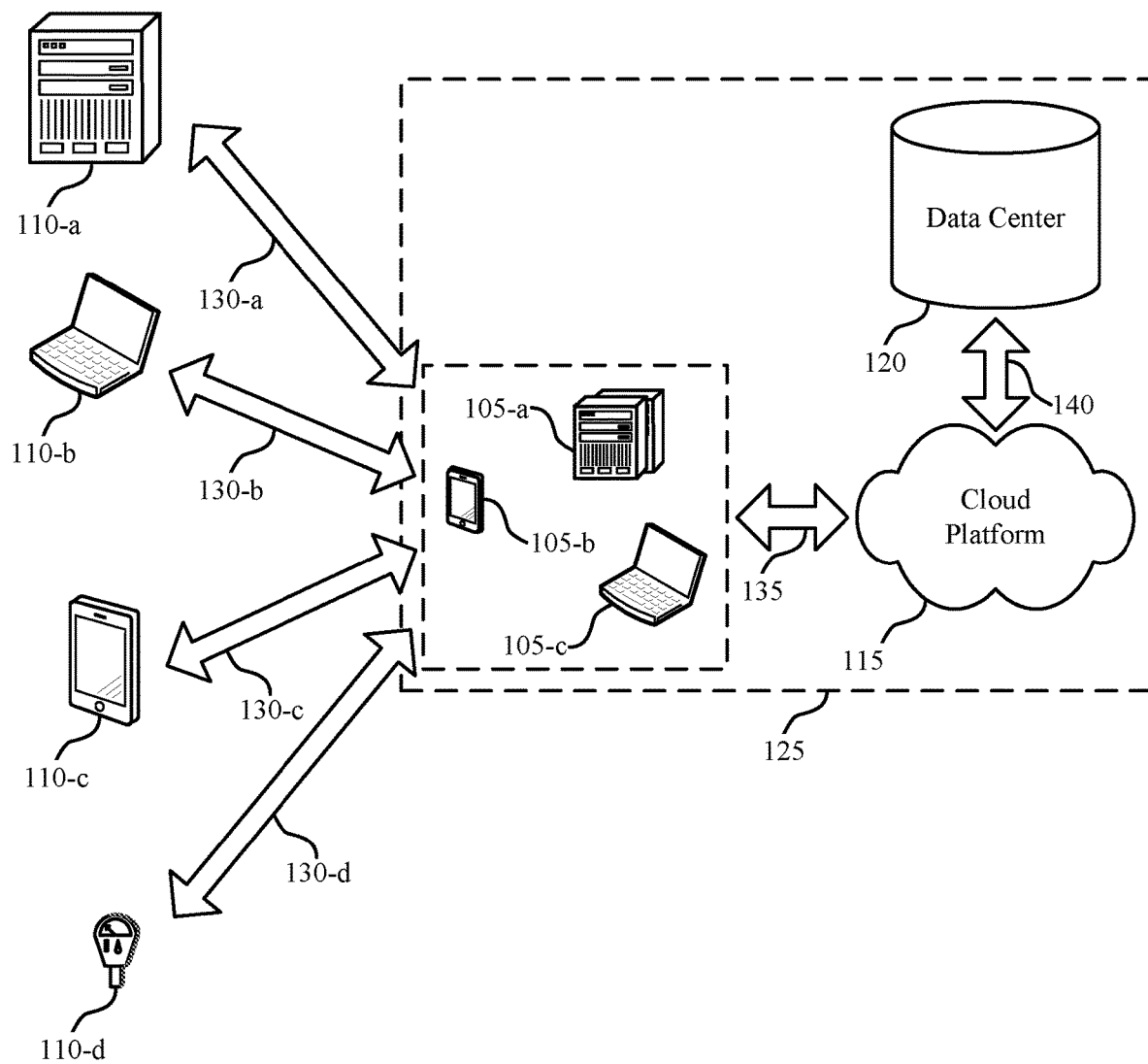
FIG. 1 illustrates an example of a system for providing access to a service that supports tenant aware mutual transport layer security (mTLS) authentication in accordance with aspects of the present disclosure.

Various systems, services, data, and combinations thereof are secured using various techniques. In some examples, a user may enter a username and/or password to gain access to these secured systems. In the same or alternative examples, various cryptographic protocols and techniques may be used for gaining access to these systems. Transport layer security (TLS) is a cryptographic protocol that may be used to provide secure access to systems, such as an application server. The protocol is used to provide privacy and data integrity. In such systems, a server may provide a digital certificate to a client, and the digital certificate may indicate the server's public key and the certificate authority that vouches for the certificate, among other features. In a mutual TLS (mTLS) system, both the server and the client may exchange certificates. However, such systems are not widely used in server-client scenarios where the client is an actual user device (e.g., rather than server to server communications). mTLS may not be used because issuing certificates to client devices may involve complexities.

Techniques described herein support utilization of a mTLS service that is trusted by or otherwise associated with a tenant of a multi-tenant system for accessing a service supported by the tenant, such as a data access service, an application server, an analytical server or data store, or the like. A client, which may be an example of aspects (e.g., a browser) of a user device, may be configured with a certificate that is associated with the tenant. For example, the certificate may be issued or provisioned by the tenant using a certificate authority supported by the tenant or using a certificate authority trusted by the tenant. The client may request access to a tenant service, and the tenant service may determine whether the client is in possession of a valid access indicia, which may be an example of a browser cookie, a JavaScript object notation (JSON) web token, a hypertext transfer protocol (HTTP) parameter, or a combination thereof. The access indicia may be issued by the service to the client and may be associated with a time to live value. Thus, if the time to live value is expired, then the service may determine that the access indicia is invalid.

If the service determines that the client is not in possession of a valid access indicia, then the service may transmit a redirection response to the client, and the redirection response may indicate an endpoint for the mTLS service that is associated with or trusted by the tenant. In response to receiving the redirection response, the client may perform a digital handshake with the mTLS service, and the mTLS service may validate the client digital certificate and digitally sign the client digital certificate using a private key associated with the mTLS service. Signing the digital certificate may establish a chain of trust between the client and the mTLS. The mTLS may transmit a redirection response, which redirects the client back to the service where the client presents an indication of the digitally signed digital certificate chain. The service may validate the chain of trust associated with the digitally signed digital certificate chain and issue an indication that the client is authenticated to access the service. The indication may be an example of an access indicia (e.g., a browser cookie, a JSON web token, a HTTP parameter) that the client may use for some period of time defined by a time to live value associated with the access indicia.

Thus, according to these and other techniques described herein, a client may use a client digital certificate and a mTLS service to access a service supported by a tenant of the multi-tenant system. Because the service trusts the mTLS, the service may trust that the mTLS has validated the client certificate. Further, because these techniques may be implemented using browser redirects, the various validation and authentication techniques may be performed with little to no user interaction.

Aspects of the disclosure are initially described in the context of an environment supporting an on-demand database service. Aspects of the disclosure are further described with respect to a system diagram illustrating various signaling that support tenant aware mTLS authentication and process flows that support tenant aware mTLS authentication. Aspects of the disclosure are further illustrated by and described with reference to apparatus diagrams, system diagrams, and flowcharts that relate to tenant aware mTLS authentication.

FIG. 1 illustrates an example of a system 100 for cloud computing that supports tenant aware mTLS authentication in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, cloud platform 115 may support client authentication before providing access to a service supported by the cloud platform 115. For example, the cloud platform 115 and associated systems may support a service, such as an application server, data access, or other types of services to various users, such as employees of a cloud client 105. More particularly, the cloud client 105 may configure one or more services at the cloud platform 115, and employees, users, customers, etc. of the cloud client 105 may access the service supported by the cloud platform 115. Various client authentication techniques may be used to support access to the service, such as, for example, username and password, TLS authentication, among others.

As discussed, some services may support client authentication using usernames and passwords. However, such systems may be subject to user error or other problems that may result in unauthorized access to systems or a user being unable to access the system. Thus, systems that support client authentication with no or little user interaction may be more secure.

Implementations described herein may leverage a client digital certificate, a mTLS service associated with a tenant, and access indicia to support authentication to a service supported by a tenant of the cloud platform 115. For example, the cloud platform 115 may support a mTLS service that is used and trusted by various tenants of a multi-tenant system supported by the cloud platform. A client (e.g., a device of cloud client 105) may request access to a service associated with a tenant and supported by the cloud platform 115. To authenticate into the service, the service may determine whether the client has a valid access token/indicia (e.g., a JavaScript object notation (JSON) web token) before allowing access. If the client does not have a valid access token, the client may be redirected to the mTLS service supported by the cloud platform, which authenticates a digital certificate of the client. Based on the authentication of the certificate by the mTLS, the client may receive a new valid access token and access the service using the token for some period of time. This process supports secure and efficient authentication, since mTLS may use certificates of the server (e.g., mTLS service) and the client. Further, since browser redirects may be used, little to no user interaction may be necessary, which may avoid or limit unauthorized access or user lock out of the service.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example utilization of the techniques described herein, a client may be an example of a browser that is used by an employee of a cloud client 105. The browser or the device that executes the browser may store and access a digital certificate. For example, a private key associated with the digital certificate may be stored in a secure enclave of the client. The digital certificate and private key may be provisioned by the tenant (e.g., cloud client 105) or a certificate authority associated with the tenant. The client/browser may request access to a service supported by the cloud client 105. For example, a user may navigate to a uniform resource locator (URL) associated with the service. The service may determine whether the client is provisioned with an access indicia (e.g., a web browser cookie) before allowing the client to access the service. In some cases, the service determines whether a time to live associated with the cookie is valid or expired. If the service determines that the client does not have a valid access indicia (e.g., no token or an expired token), then the service transmits a redirection response to the client, which redirects the client to a mTLS service trusted by the service and the cloud client 105. The mTLS service validates the client digital certificate (e.g., certificate chain), signs the digital certificate, and redirects the client back to the service. The service validates the certificate signed by the mTLS service, and provisions the client with an access indicia (e.g., a web browser cookie), which allows the client to access the service. The provisioned access indicia may be associated with an expiration time.

Figure 2:
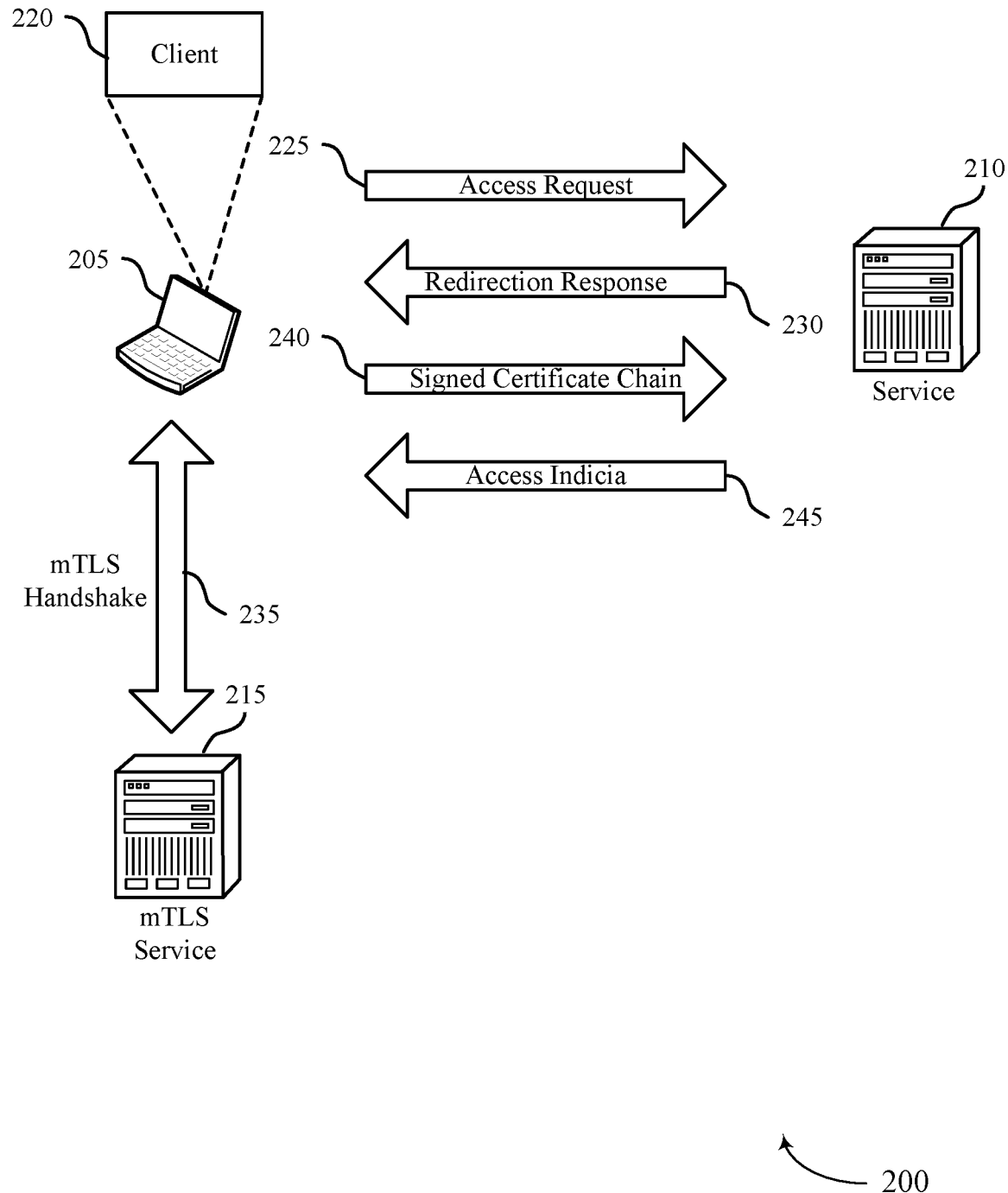
FIG. 2 illustrates an example of a system that supports tenant aware mTLS authentication in accordance with aspects of the present disclosure.

FIG. 2 illustrates an example of a system 200 that supports tenant aware mTLS authentication in accordance with aspects of the present disclosure. The system 200 includes a user device 205, a server 210, and a server 215. The user device 205 may be an example of a laptop, desktop, tablet, smart phone, or another type of user computing system. The user device 205 executes a client 220, which may be an example of a client application such as a browser, or other application that is executed at the user device 205. The server 210 and/or server 215 may be examples of aspects of the cloud platform of FIG. 1. For example, the server 210 may be an example of an application server or web server. The server 210 may host various services, such as a web applications service or one or more websites. The server 215 may host a mTLS service. In some examples, the server 210 and 215 are hosted in the same physical or logical systems or in separate systems. The client 220 may be provisioned with or have access to a client digital certificate (e.g., certificate chain) that is associated with a private key.

The client 220 may transmit an access request 225 to the server 210. The access request may be an example of a HTTP request, an application programming interface (API) request, or the like. In some examples, the access request 225 is transmitted to the server 210 in response to a user navigating to a website URL, activating a service on an application, or the like. In response to receiving the access request, the service (e.g., the server 210) may determine whether the client 220 is provisioned with a valid access indicia. The access indicia may be an example of a web browser cookie, a JSON web token (JWT), or the like. More particularly, the access indicia may include a payload that asserts a claim, such as that the client 220 is authenticated to access the service supported by the server 210. In some examples, the access indicia is digitally (e.g., cryptographically) signed using a key, such as a key associated with the server 210. Thus, the server may have previously provisioned the client 220 with the signed access indicia. In some cases, the access indicia includes an expiration time or another field that indicates when the indicia is to expire. Thus, upon receiving the request, the server 210 may determine whether the access indicia is valid based on the expiration time and based on the digital signature. If the server determines that the client 220 is in possession of a valid access indicia, then the server 210 may grant access to the service.

If the server 210 determines that the client 220 is not in possession of a valid access indicia (e.g., the token has expired, the server 210 is not able to validate the signature, or the client 220 is not in possession of an access indicia), then the server 210 may transmit a redirection response 230 to the client. The redirection response 230 may be in the form of a browser redirect. The redirection response 230 may indicate a mTLS service supported by the server 215. Thus, in response to receiving the redirection response 230, the client 220 may navigate to (e.g., transmit an HTTP request to) the mTLS service.

The mTLS service of the server 215 performs mutual authentication with the client 220 using mutual entity authentication principles. More particularly, the client 220 and the mTLS services may verify the other's identity using a digital handshake 235. As a part of the digital handshake procedure, the client 220 may request a valid certificate from the server 210 and validate the certificate. Further, the server 215 may request a valid certificate from the client 220 and validate the certificate. Validation of the certificates may include exchanging encrypted random challenges and proving that the certificate is legitimate by decrypting the random challenges with a private key associated with the certificate. For example, to validate the server certificate, the client 220 may encrypt a random challenge using the public key of the server certificate. The server may then prove the legitimacy of the certificate by decrypting the random challenge using the private key associated with the certificate. The server 215 may similarly validate the client digital certificate. The handshake may also include validating the chain of trusts of the certificate. Aspects of the disclosure are described with respect to mTLS, but it should be understood that other cryptographic protocols in which both parties exchange certificates may be used within the context of the present disclosure.

Upon mutual authentication, the mTLS service may digitally sign the client certificate (e.g., client certificate chain) and associate an expiration time with the signed certificate chain. The client certificate may be an example of an X.509 certificate. This payload (e.g., client certificate chain and expiration time) may be provided to the client as an access indicia, such as the JWT as described herein. Further, the client 220 may be redirected back to the service via a redirection response from the mTLS service supported by server 215. The client 220 presents the signed certificate chain 240 to the service supported by the server 210. In some cases, the service is configured to access the access indicia (e.g., the signed certificate chain 240) stored at the client 220 (e.g., as a browser cookie). Thus, the client "presenting" the signed certificate chain 240 may include the client transmitting a request, and the service accessing the cookie. The service may validate the access indicia by determining that the expiration time is not passed and by validating the signature based on an mTLS public key. If the service validates the access indicia, then the service may generate a new short lived access indicia 245 that is associated with the service and provide the access indicia 245 to the client 220 (e.g., store a web browser cookie). This access indicia 245 may support access to the service for some period of time defined by an expiration time or time to live value.

Thus, according to these techniques, the service supported by the server 210 and the mTLS service supported by the server 215 may implement certificate validation and thus client authentication, along with browser redirects to authenticate a client. Further according to these techniques, the client 220 may be validated with little or no interaction by the user of the user device 205. Further, the use of mTLS along with a client certificate may provide additional layers of security relative to other authentication techniques without introducing weaknesses in the system based on usernames and passwords.

Figure 3:
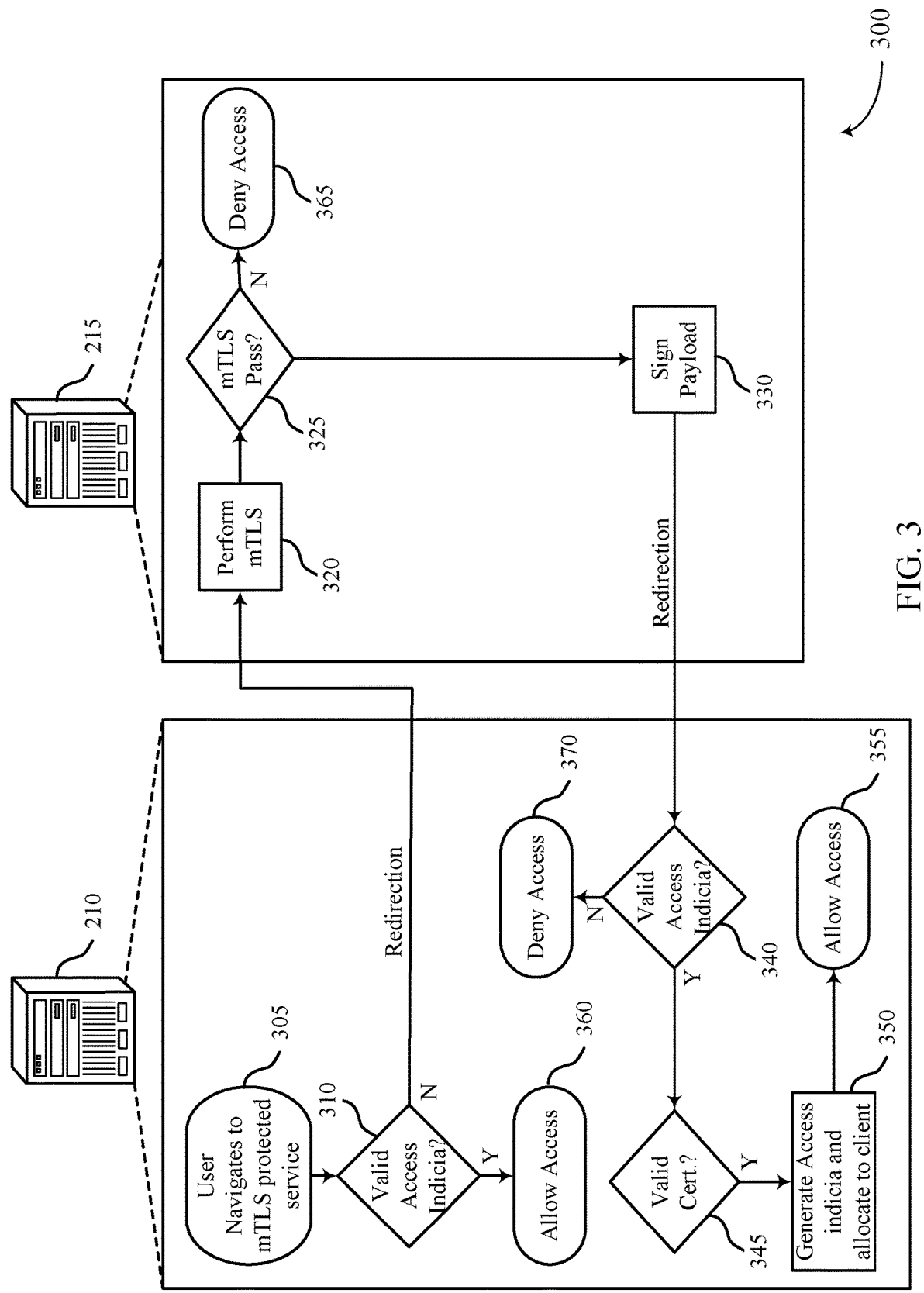
FIG. 3 illustrates an example of a system that supports tenant aware mTLS authentication in accordance with aspects of the present disclosure.

FIG. 3 illustrates an example of a system 300 that supports tenant aware mTLS authentication in accordance with aspects of the present disclosure. The system 300 includes server 210 and server 215, which may be examples of the corresponding devices as described with respect to FIG. 2. For example, the server 210 may support a service (e.g., an application, website, or other computing service) associated with a tenant of a multi-tenant system. For example, the service may be examples of websites or web applications of the tenant. The server 215 may support a mTLS service that may be used to authenticate into services of various tenants of the multi-tenant system, such as the service supported by the server 210. The flows illustrated in FIG. 3 may be executed by the server 210 and the server 215 and in associated with a client (e.g., client 220 of FIG. 2).

At 305, a user of the client may navigate the client to a service supported by the server 210 and protected by the mTLS service supported by the server 215. At 310, the server 210 may determine whether the client possesses a valid access indicia. For example, the server 210 may determine whether the access indicia is valid and signed by the service, has not expired (e.g., based on an expiration time or time to live value), or a combination thereof. If the client possesses a valid access indicia, then the server 210 may allow the client to access the service at 360. If the client does not possess a valid access indicia, then the server 210 may transmit a redirection response to the client, and the redirection response may indicate the mTLS service supported by the server 215.

The redirection response may cause the client to transmit a request (e.g., an HTTP request) to the mTLS service supported by the server 215. In response to receiving the request, the mTLS service may perform a digital handshake with the mTLS service at 320, which may include exchanging and validating certificates, among other processes. At 320, the mTLS service may determine whether the mTLS digital handshake passes or fails. If the mTLS digital handshake fails (e.g., the mTLS service is unable to validate the client certificate chain), then the mTLS service may deny access at 365. In some examples, access denial may include redirecting the client to a denial page. If the mTLS passes, then the mTLS service may digitally sign the client certificate chain and generate and associate an expiration time with the signed certificate chain at 330. The payload that includes the signed certificate chain and the expiration time may be provided to the client as an access indicia (e.g., a web browser cookie). Further, the mTLS service may transmit a redirection response to the client, and the redirection response may indicate the service. In some cases, the redirection response includes the payload that includes the signed certificate chain and expiration time.

The expiration time is associated with the signed client certificate chain in order to avoid replay attacks. Thus, the expiration time is used to validate that the signed payload is fresh or was generated in a recent time period. In some examples, the expiration time is in the order of five to fifteen minutes. Thus, the mTLS service, by signing the payload (including the certificate chain and/or the expiration time), generates a digital signature that the service may subsequently verify (e.g., using a public key of the mTLS). In some cases, if the client is configured with multiple certificates, then the browser may trigger a user interface (UI) at which the user selects a certificate to use for the mTLS authentication. Thus, the client may receive a selection of a certificate that is to be presented to the mTLS.

In response to receiving the redirection response from the mTLS service, at 340 the client may transmit another access request (e.g., a HTTP request) to the service. In response, the service determines whether the client possesses a valid access indicia, which may be the payload including the client certificate chain signed by the mTLS server and the associated expiration time. As such, determining whether the client has a valid access indicia may include determining whether the expiration time is expired. If the service determines that the client is not in possession of a valid access indicia, then the server may deny access to the service at 370. If the access indicia is valid, then the service may determine whether the certificate is valid at 345. This process may include validating the chain of trust associated with the certificate. For example, the service may determine that the client certificate chain is signed by the private key of the mTLS. In some examples, validating the chain of trust may include verifying the client certificate chain with a root that the tenant trusts. In a multi-tenant system example, where each tenant may use the mTLS service for authentication, each tenant or a subset of tenants may use the same root. More particularly, each tenant may trust the same root and thus use this root to validate the respective client certificate chains. If the certificate chain is not validated, then the service may deny access to the client.

If the certificate chain is validated at 345, then the service may generate another access indicia that is allocated to the client at 350. The access indicia may allow the client to access the service at 355. The access indicia generated at 350 may be associated with a longer time to live than the time to live associated with the signed client certificate chain. For example, the access indicia may be associated with an expiration time that is a few hours to a day after generation of the access indicia. The length of the expiration time may be based on a tenant configuration, for example. Thus, some tenants may configure a shorter expiration time for higher security. Upon expiration of the expiration time, the client 220 may perform another mTLS authentication for authenticating into the service.

Figure 4:
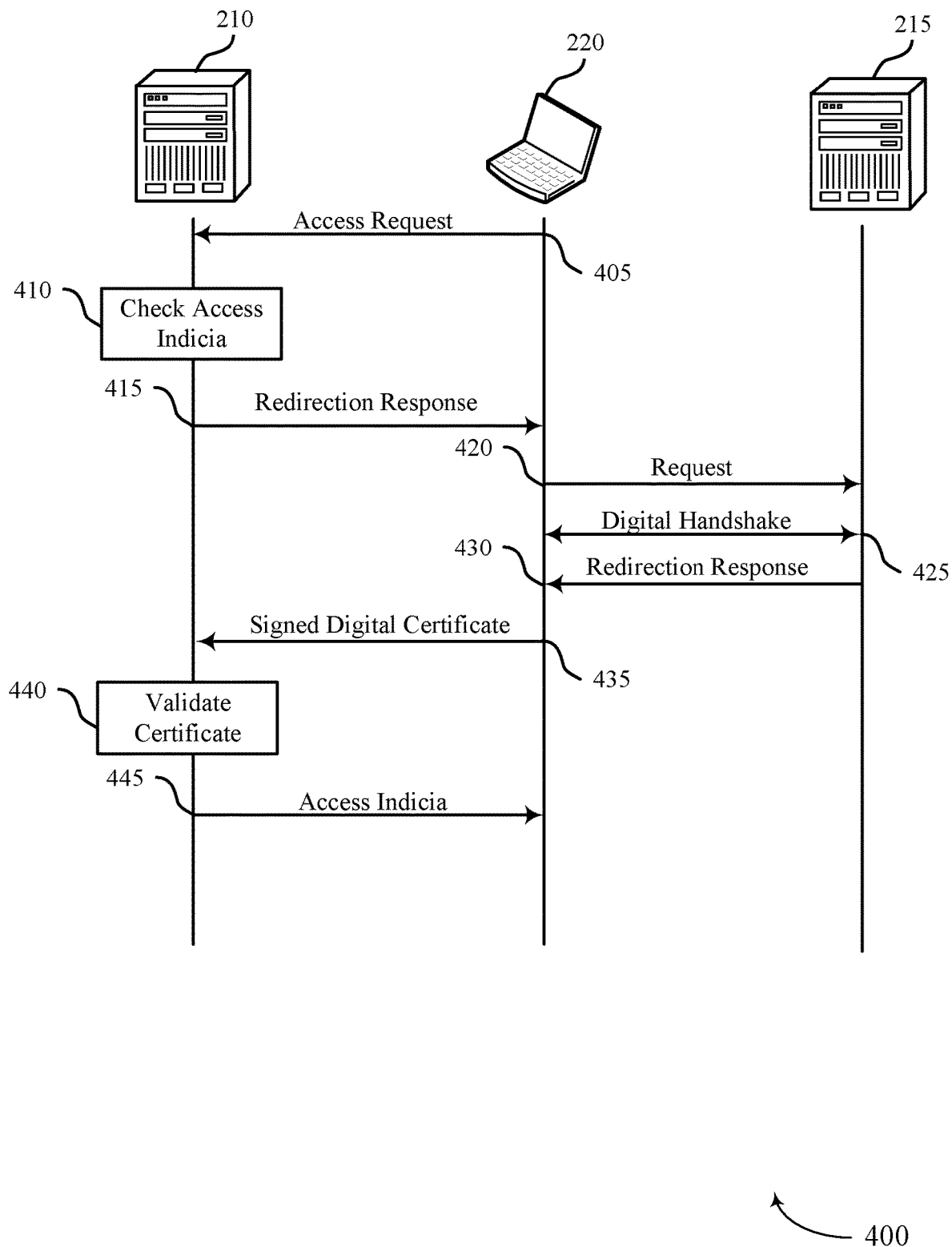
FIG. 4 illustrates a process flow that supports tenant aware mTLS authentication in accordance with aspects of the present disclosure.

FIG. 4 illustrates an example of a process flow diagram 400 that supports tenant aware mTLS authentication in accordance with aspects of the present disclosure. The process flow diagram includes a server a client 220, a server 210, and a server 215, which may be examples of the corresponding devices described with respect to FIGS. 2 and 3. The client 220 may be an application that is executable on a user device, such as user device 205 of FIG. 2.

At 405, a service supported by the server 210 and by a tenant of a multi-tenant system, may receive, from client 220, an access request for accessing the service. The client 220 may be configured with a digital certificate chain associated with the tenant. The digital certificate chain may be associated with the tenant based at least in part on being issued by or provisioned by the tenant using a third party certificate authority. The request may be transmitted by the client based at least in part on the client 220 being navigated to an endpoint (e.g., URL, API endpoint) by a user of the client 220. For example, the request may be an example of an HTTP request.

At 410, the service supported by the server 210 may determine whether the client 220 is in possession of a valid access indicia. For example, the server 210 may determine whether an existing access indicia is expired, is signed by a signing key (e.g., a public key of the service), or whether the client 220 possesses an access indicia. The access indicia may be an example of a JWT, a web browser cookie, an HTTP parameter, or the like.

At 415, the service supported by the server 210 may transmit, to the client 220, a first redirection response that indicates a mutual transport layer security service supported by the server 215 based at least in part on failing to receive a valid indication that the client is authenticated to access the service. Thus, in response to failing to determine that the client 220 is in possession of a valid access indicia, the server 210 transmits a redirection response to the client 220. The redirection response may be an example of an HTTP redirect, browser redirect, or the like.

At 420, the client 220 may transmit a request to the mTLS service supported by the server 215. The request may be transmitted in response to receiving the redirection response from the server 210.

At 425, the client 220 performs a digital handshake with the mTLS service based at least in part on receiving the first redirection response. Performing the digital handshake may include transmitting an indication of the client digital certificate chain associated with the mutual transport layer security service, among other procedures.

At 430, the client 220 may receive, from the mTLS service based at least in part on the digital handshake, a second redirection response including a digitally signed version of the client digital certificate chain. The digital certificate chain is signed using a private key associated with the mutual transport layer security service. The redirection response with the signed digital certificate chain may be transmitted by the server 215 based at least in part on validating the digital certificate chain of the client. The mTLS service may be configured to support a plurality of tenants of the multi-tenant system for authenticating various clients into various services.

At 435, the service supported by the server 210 may receive, from the client 220, an indication of a digitally signed version of the digital certificate chain. The client may present the indication of the digitally signed version of the digital certificate chain, based at least in part on receiving the second redirection response. The indication of the digitally signed version of the client digital certificate chain may be presented by the client 220 based at least in part on an access request (e.g., HTTP request) transmitted to the service in response to the redirection response.

At 440, the service supported by the server 210 may validate the digitally signed version of the digital certificate chain. Validation may include determining that the signed certificate chain is not expired, validating the chain of trust (e.g., that the chain is signed by a signing key of the mTLS), among other procedures. At 445, the server 210 may transmit, to the client 220, an indication that the client is authenticated to access the service based at least in part on validating the digitally signed version of the digital certificate chain. The indication may be an example of an access indicia (e.g., JWT) that claims that the client is able to access the service. In some examples, the access indicia is associated with an expiration time.

Figure 5:
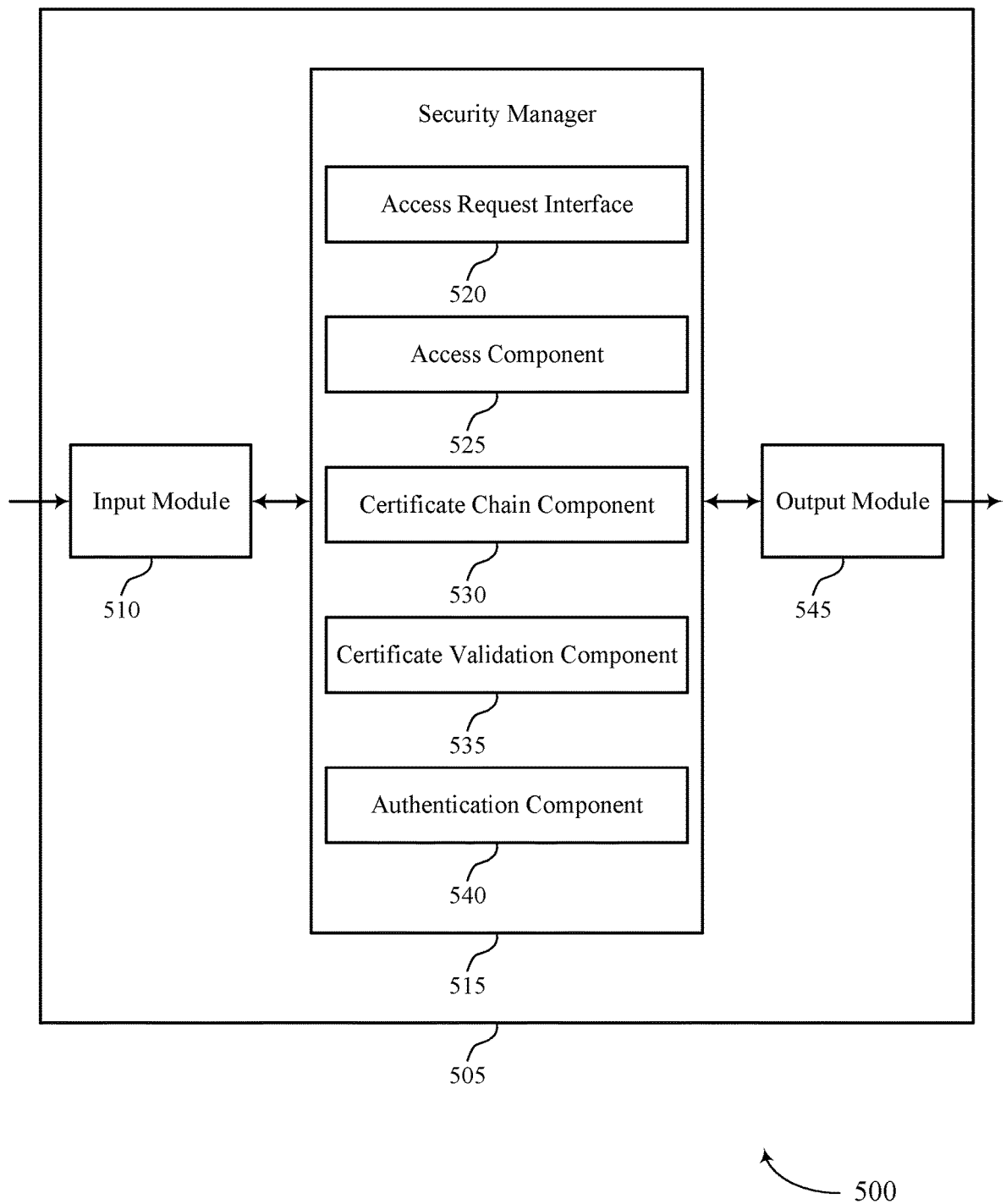
FIG. 5 shows a block diagram of an apparatus that supports tenant aware mTLS authentication in accordance with aspects of the present disclosure.

FIG. 5 shows a block diagram 500 of an apparatus 505 that supports tenant aware mTLS authentication in accordance with aspects of the present disclosure. The apparatus 505 may include an input module 510, a security manager 515, and an output module 545. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the security manager 515 to support mTLS authentication. In some cases, the input module 510 may be a component of an input/output (I/O) controller 715 as described with reference to FIG. 7.

The security manager 515 may include an access request interface 520, an access component 525, a certificate chain component 530, a certificate validation component 535, and an authentication component 540. The security manager 515 may be an example of aspects of the security manager 605 or 710 described with reference to FIGS. 6 and 7.

The security manager 515 and/or at least some of its various sub-components may be implemented in hardware, software executed by a processor, firmware, or any combination thereof. If implemented in software executed by a processor, the functions of the security manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The security manager 515 and/or at least some of its various sub-components may be physically located at various positions, including being distributed such that portions of functions are implemented at different physical locations by one or more physical devices. In some examples, the security manager 515 and/or at least some of its various sub-components may be a separate and distinct component in accordance with various aspects of the present disclosure. In other examples, the security manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The access request interface 520 may receive, by the service supported by a tenant of a multi-tenant system and from a client, an access request for accessing the service, the client configured with a digital certificate chain associated with the tenant.

The access component 525 may transmit, by the service to the client, a first redirection response that indicates a mutual transport layer security service based on failing to receive a valid indication that the client is authenticated to access the service.

The certificate chain component 530 may receive, from the client, an indication of a digitally signed version of the digital certificate chain, where the digital certificate chain is signed using a root key associated with the mutual transport layer security service that is trusted by the truest.

The certificate validation component 535 may validate the digitally signed version of the digital certificate chain.

The authentication component 540 may transmit, to the client, an indication that the client is authenticated to access the service based on validating the digitally signed version of the digital certificate chain.

The output module 545 may manage output signals for the apparatus 505. For example, the output module 545 may receive signals from other components of the apparatus 505, such as the data retention module 515, and may transmit these signals to other components or devices. In some specific examples, the output module 545 may transmit output signals for display in a user interface, for storage in a database or data store, for further processing at a server or server cluster, or for any other processes at any number of devices or systems. In some cases, the output module 545 may be a component of an I/O controller 715 as described with reference to FIG. 7.

Figure 6:
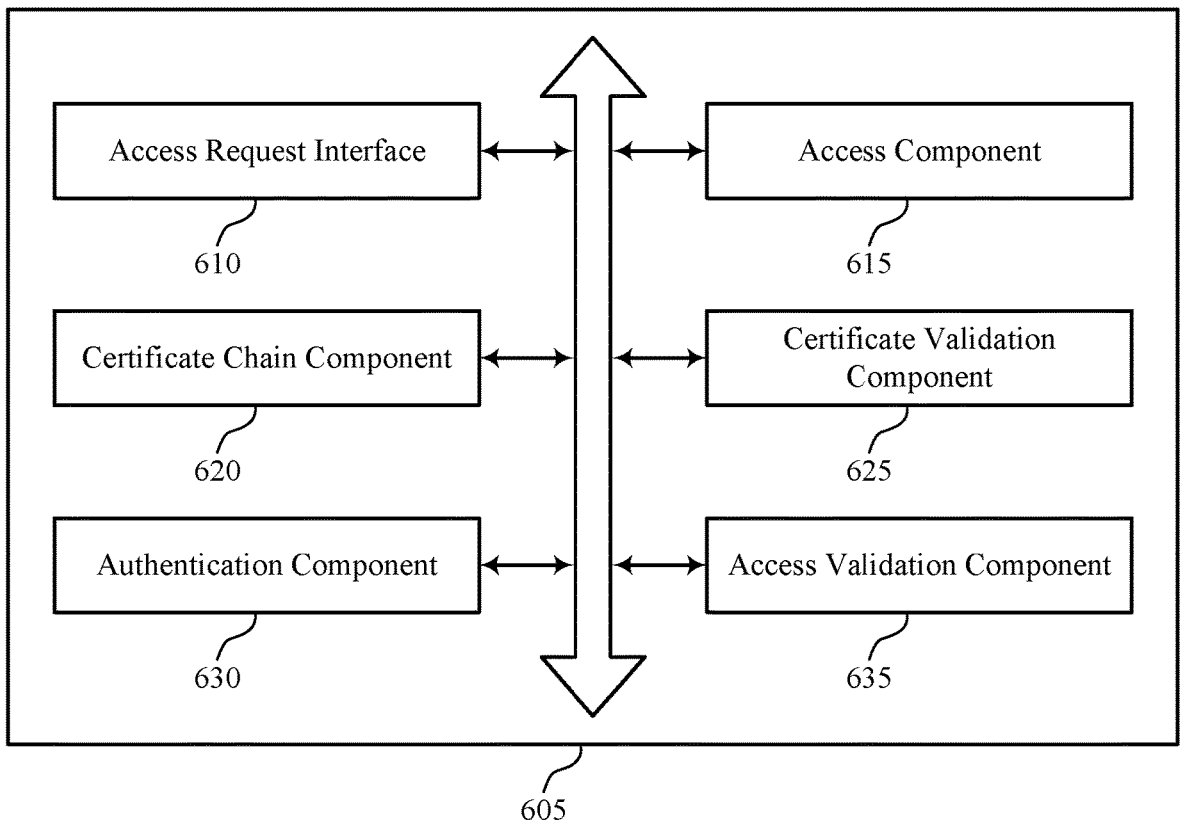
FIG. 6 shows a block diagram of a security manager that supports tenant aware mTLS authentication in accordance with aspects of the present disclosure.

FIG. 6 shows a block diagram 600 of a security manager 605 that supports tenant aware mTLS authentication in accordance with aspects of the present disclosure. The security manager 605 may be an example of aspects of a security manager 515 or a security manager 710 described herein. The security manager 605 may include an access request interface 610, an access component 615, a certificate chain component 620, a certificate validation component 625, an authentication component 630, and an access validation component 635. Each of these modules may communicate, directly or indirectly, with one another (e.g., via one or more buses).

The access request interface 610 may receive, by the service supported by a tenant of a multi-tenant system and from a client, an access request for accessing the service, the client configured with a digital certificate chain associated with the tenant.

The access component 615 may transmit, by the service to the client, a first redirection response that indicates a mutual transport layer security service based on failing to receive a valid indication that the client is authenticated to access the service.

The certificate chain component 620 may receive, from the client, an indication of a digitally signed version of the digital certificate chain, where the digital certificate chain is signed using a root key associated with the mutual transport layer security service that is trusted by the truest.

In some cases, the client digital certificate chain is associated with the tenant based on the client digital certificate chain being issued by or provisioned by a third party certificate authority.

The certificate validation component 625 may validate the digitally signed version of the digital certificate chain.

In some examples, the certificate validation component 625 may validate a certificate chain associated with the digitally signed version of the digital certificate chain.

In some examples, the certificate validation component 625 may determine that an expiration time associated with the digital certificate chain is not expired.

In some cases, the service is supported by the tenant of a multi-tenant system that is associated with the mutual transport layer security service.

The authentication component 630 may transmit, to the client, an indication that the client is authenticated to access the service based on validating the digitally signed version of the digital certificate chain.

In some examples, storing an access indicia at the client, where the access indicia includes a browser cookie, a JSON web token, a HTTP parameter, or a combination thereof.

The access validation component 635 may determine, based on receiving the access request, that an access indicia presented by the client is invalid, where the service transmits the first redirection response based on determining that the access indicia is invalid.

In some examples, the access validation component 635 may determine that a time to live value associated with the access indicia is not expired.

In some cases, the access indicia includes a browser cookie, a JSON web token, a HTTP parameter, or a combination thereof.

Figure 7:
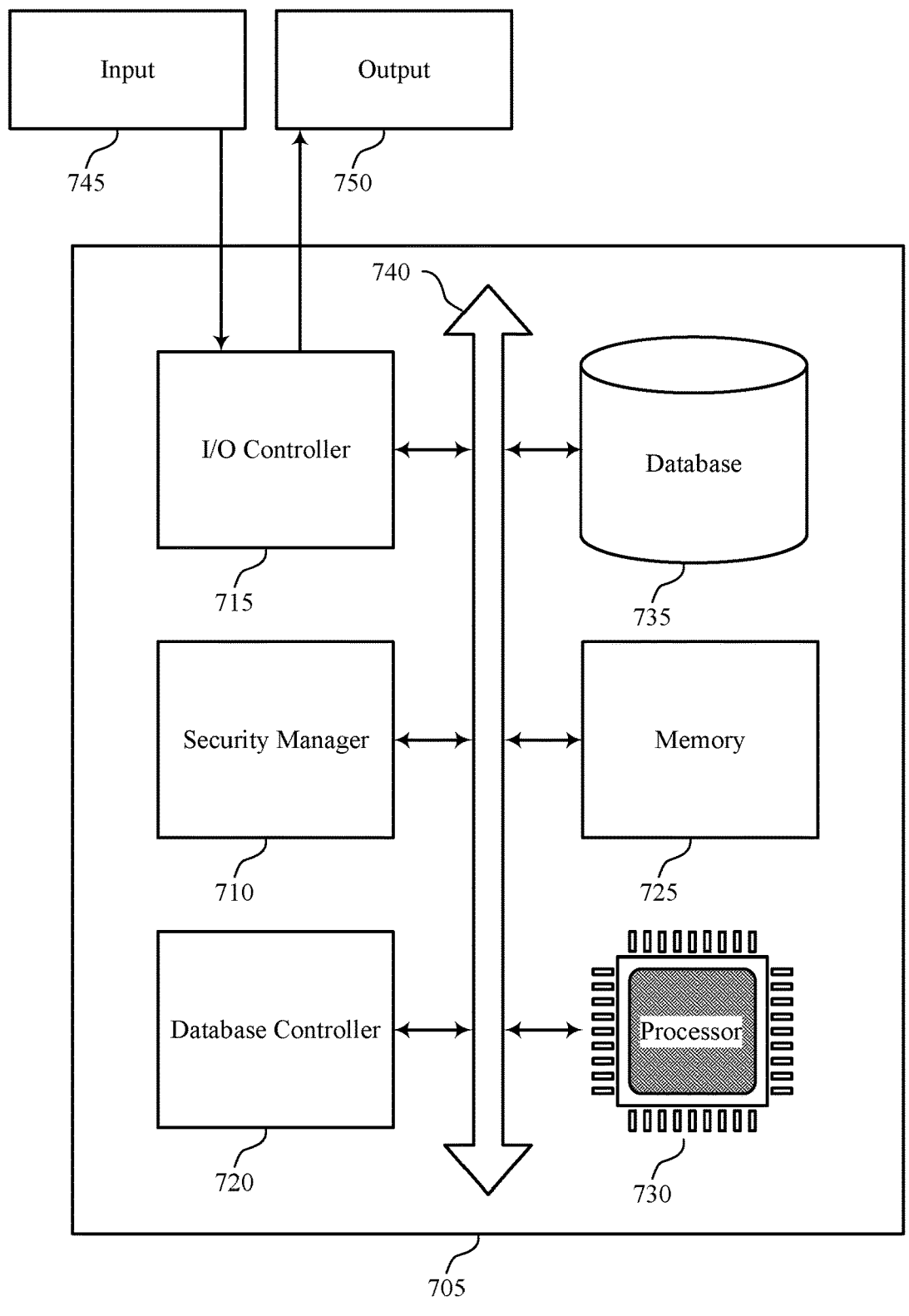
FIG. 7 shows a diagram of a system including a device that supports tenant aware mTLS authentication in accordance with aspects of the present disclosure.

FIG. 7 shows a diagram of a system 700 including a device 705 that supports tenant aware mTLS authentication in accordance with aspects of the present disclosure. The device 705 may be an example of or include the components of an application server or an apparatus 505 as described herein. The device 705 may include components for bi-directional data communications including components for transmitting and receiving communications, including a security manager 710, an I/O controller 715, a database controller 720, memory 725, a processor 730, and a database 735. These components may be in electronic communication via one or more buses (e.g., bus 740).

The security manager 710 may be an example of a security manager 515 or 605 as described herein. For example, the security manager 710 may perform any of the methods or processes described herein with reference to FIGS. 5 and 6. In some cases, the security manager 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting tenant aware mTLS authentication).

Figure 8:
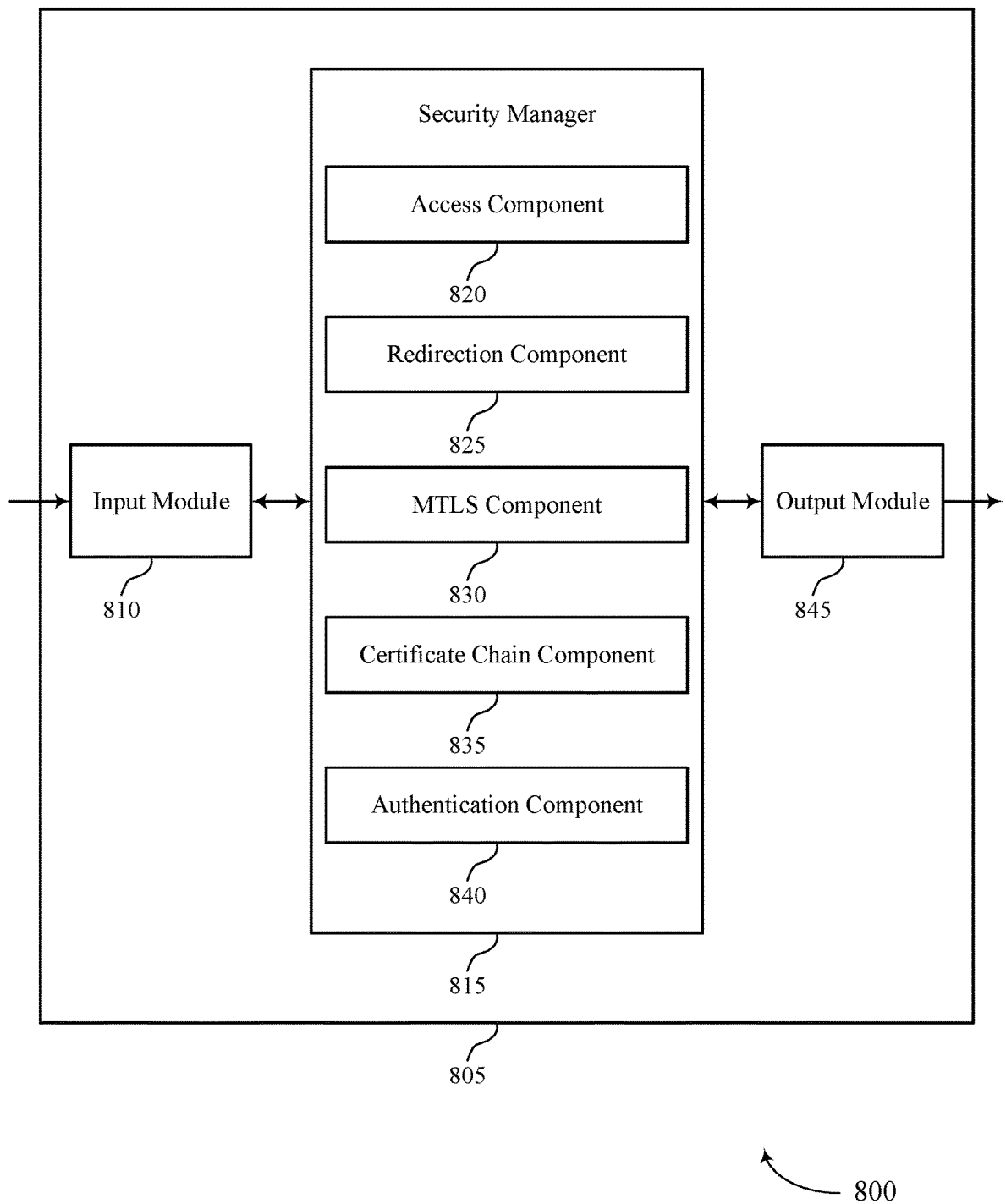
FIG. 8 shows a block diagram of an apparatus that supports tenant aware mTLS authentication in accordance with aspects of the present disclosure.

FIG. 8 shows a block diagram 800 of an apparatus 805 that supports tenant aware mTLS authentication in accordance with aspects of the present disclosure. The apparatus 805 may include an input module 810, a security manager 815, and an output module 845. The apparatus 805 may also include a processor. Each of these components may be in communication with one another (e.g., via one or more buses). In some cases, the apparatus 805 may be an example of a user terminal, a database server, or a system containing multiple computing devices.

The input module 810 may manage input signals for the apparatus 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the apparatus 805 for processing. For example, the input module 810 may transmit input signals to the security manager 815 to support tenant aware mTLS authentication. In some cases, the input module 810 may be a component of an input/output (I/O) controller 1015 as described with reference to FIG. 10.

The security manager 815 may include an access component 820, a redirection component 825, a mTLS component 830, a certificate chain component 835, and an authentication component 840. The security manager 815 may be an example of aspects of the security manager 905 or 1010 described with reference to FIGS. 9 and 10.

The security manager 815 and/or at least some of its various sub-components may be implemented in hardware, software executed by a processor, firmware, or any combination thereof. If implemented in software executed by a processor, the functions of the security manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The security manager 815 and/or at least some of its various sub-components may be physically located at various positions, including being distributed such that portions of functions are implemented at different physical locations by one or more physical devices. In some examples, the security manager 815 and/or at least some of its various sub-components may be a separate and distinct component in accordance with various aspects of the present disclosure. In other examples, the security manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The access component 820 may transmit, by a client and to the service supported by a tenant, an access request for accessing the service, the client configured with a client digital certificate chain associated with the tenant.

The redirection component 825 may receive, at the client and from the service, a first redirection response that indicates a mutual transport layer security service based on failing to present a valid indication that the client is authenticated to access the service and receive, from the mutual transport layer security service based on the digital handshake, a second redirection response including a digitally signed version of the client digital certificate chain, where the digital certificate chain is signed using a private key associated with the mutual transport layer security service.

The mTLS component 830 may perform a digital handshake with the mutual transport layer security service based on receiving the first redirection response, where performing the digital handshake includes transmitting an indication of the client digital certificate chain associated with the mutual transport layer security service.

The certificate chain component 835 may present, by the client based on receiving the second redirection response, an indication of the digitally signed version of the client digital certificate chain.

The authentication component 840 may receive, from the service based on presenting the indication of the digitally signed version of the client digital certificate chain, an indication that the client is authenticated to access the service.

The output module 845 may manage output signals for the apparatus 805. For example, the output module 845 may receive signals from other components of the apparatus 805, such as the security manager 815, and may transmit these signals to other components or devices. In some specific examples, the output module 845 may transmit output signals for display in a user interface, for storage in a database or data store, for further processing at a server or server cluster, or for any other processes at any number of devices or systems. In some cases, the output module 845 may be a component of an I/O controller 1015 as described with reference to FIG. 10.

Figure 9:
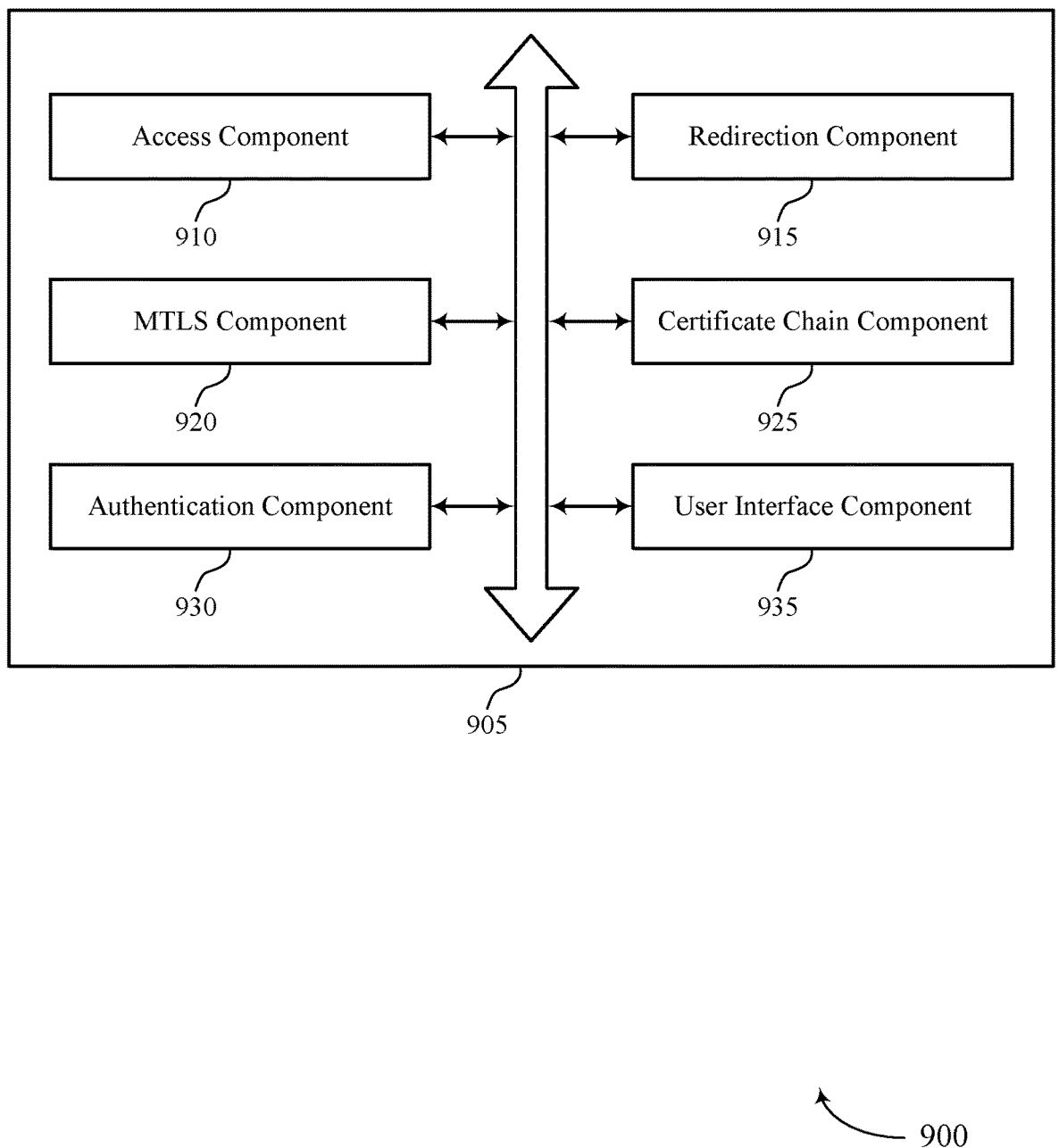
FIG. 9 shows a block diagram of a security manager that supports tenant aware mTLS authentication in accordance with aspects of the present disclosure.

FIG. 9 shows a block diagram 900 of a security manager 905 that supports tenant aware mTLS authentication in accordance with aspects of the present disclosure. The security manager 905 may be an example of aspects of a security manager 815 or a security manager 1010 described herein. The security manager 905 may include an access component 910, a redirection component 915, a mTLS component 920, a certificate chain component 925, an authentication component 930, and an user interface component 935. Each of these modules may communicate, directly or indirectly, with one another (e.g., via one or more buses).

The access component 910 may transmit, by a client and to the service supported by a tenant, an access request for accessing the service, the client configured with a client digital certificate chain associated with the tenant.

In some examples, the access component 910 may present, by the client, an access indicia, where the client receives the first redirection response based on the access indicia being invalid.

In some cases, the access indicia is invalid based on a time to live value being expired.

The redirection component 915 may receive, at the client and from the service, a first redirection response that indicates a mutual transport layer security service based on failing to present a valid indication that the client is authenticated to access the service.

In some examples, the redirection component 915 may receive, from the mutual transport layer security service based on the digital handshake, a second redirection response including a digitally signed version of the client digital certificate chain, where the digital certificate chain is signed using a private key associated with the mutual transport layer security service.

The mTLS component 920 may perform a digital handshake with the mutual transport layer security service based on receiving the first redirection response, where performing the digital handshake includes transmitting an indication of the client digital certificate chain associated with the mutual transport layer security service.

The certificate chain component 925 may present, by the client based on receiving the second redirection response, an indication of the digitally signed version of the client digital certificate chain.

In some cases, the client digital certificate chain is associated with the tenant based on the client digital certificate chain being issued by or provisioned by a third party certificate authority.

The authentication component 930 may receive, from the service based on presenting the indication of the digitally signed version of the client digital certificate chain, an indication that the client is authenticated to access the service.

In some examples, receiving, from the service, an access indicia, where the access indicia includes a browser cookie, a JSON web token, a HTTP parameter, or a combination thereof.

The user interface component 935 may receive, from a user, a selection of the client digital certificate chain issued or provisioned by the tenant, where the digital handshake is performed based on receiving the selection of the digital certificate chain.

Figure 10:
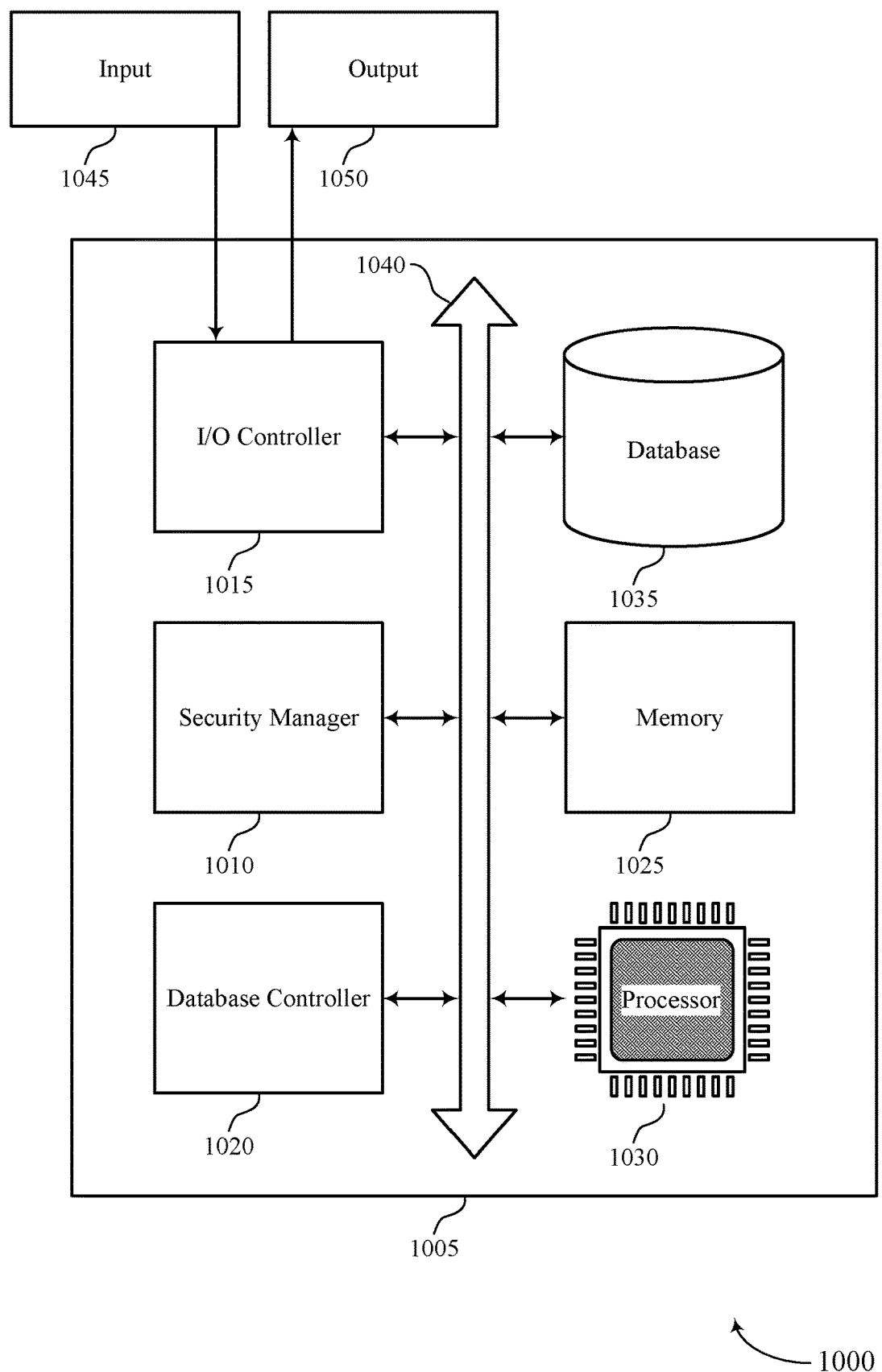
FIG. 10 shows a diagram of a system including a device that supports tenant aware mTLS authentication in accordance with aspects of the present disclosure.

FIG. 10 shows a diagram of a system 1000 including a device 1005 that supports tenant aware mTLS authentication in accordance with aspects of the present disclosure. The device 1005 may be an example of or include the components of a user device or an apparatus 805 as described herein. The device 1005 may include components for bi-directional data communications including components for transmitting and receiving communications, including a security manager 1010, an I/O controller 1015, a database controller 1020, memory 1025, a processor 1030, and a database 1035. These components may be in electronic communication via one or more buses (e.g., bus 1040).

The security manager 1010 may be an example of a security manager 815 or 905 as described herein. For example, the security manager 1010 may perform any of the methods or processes described herein with reference to FIGS. 8 and 9. In some cases, the security manager 1010 may be implemented in hardware, software executed by a processor, firmware, or any combination thereof.

The I/O controller 1015 may manage input signals 1045 and output signals 1050 for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The database controller 1020 may manage data storage and processing in a database 1035. In some cases, a user may interact with the database controller 1020. In other cases, the database controller 1020 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor to perform various functions described herein. In some cases, the memory 1025 may contain, among other things, a basic input/output system (BIOS) which may control basic hardware or software operation such as the interaction with peripheral components or devices.

The processor 1030 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting tenant aware mTLS authentication).

Figure 11:
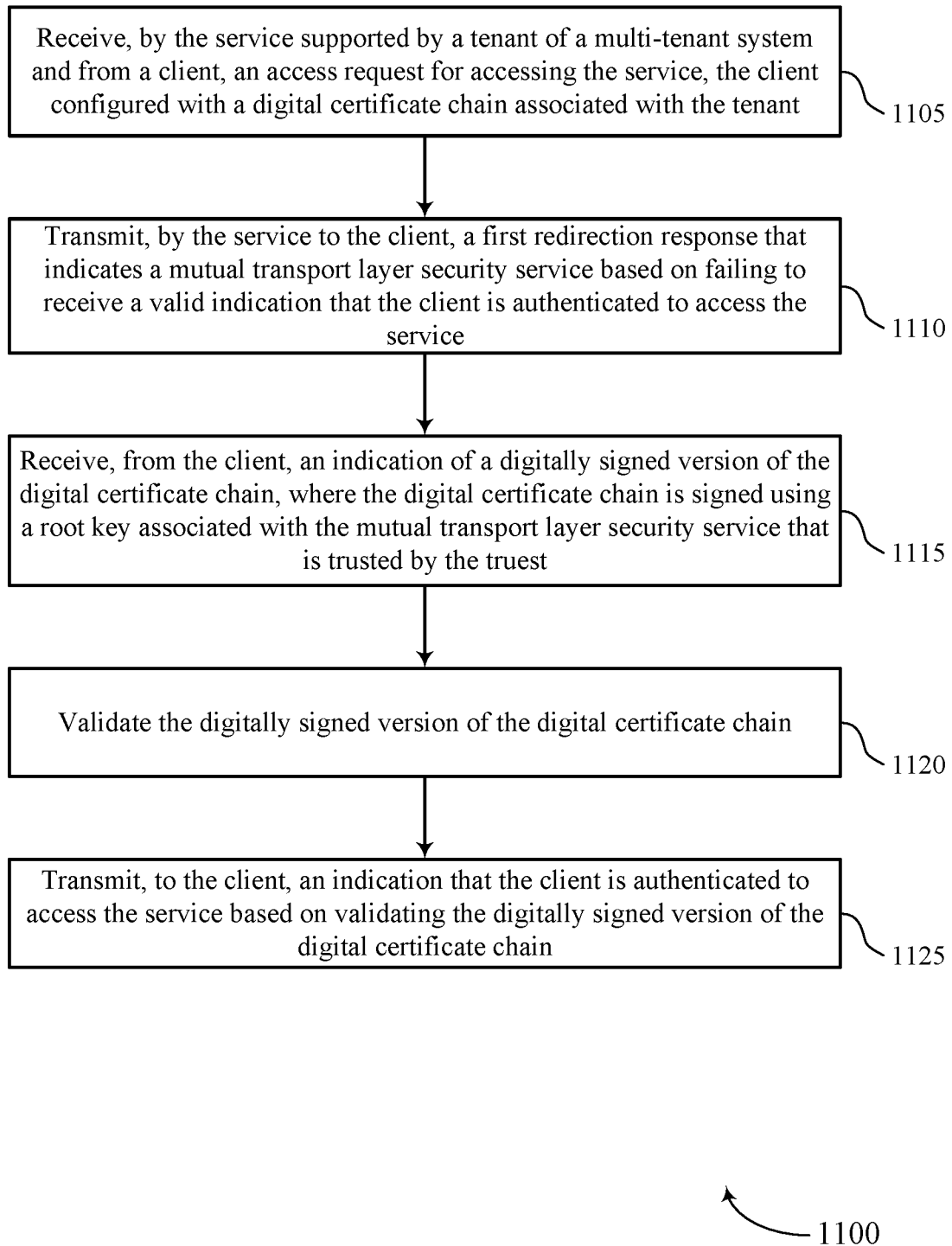
FIGS. 11 through 14 show flowcharts illustrating methods that support tenant aware mTLS authentication in accordance with aspects of the present disclosure.

FIG. 11 shows a flowchart illustrating a method 1100 that supports tenant aware mTLS authentication in accordance with aspects of the present disclosure. The operations of method 1100 may be implemented by an application server or its components as described herein. For example, the operations of method 1100 may be performed by a security manager as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1105, the application server may receive, by the service supported by a tenant of a multi-tenant system and from a client, an access request for accessing the service, the client configured with a digital certificate chain associated with the tenant. The operations of 1105 may be performed according to the methods described herein. In some examples, aspects of the operations of 1105 may be performed by an access request interface as described with reference to FIGS. 5 through 7.

At 1110, the application server may transmit, by the service to the client, a first redirection response that indicates a mutual transport layer security service based on failing to receive a valid indication that the client is authenticated to access the service. The operations of 1110 may be performed according to the methods described herein. In some examples, aspects of the operations of 1110 may be performed by an access component as described with reference to FIGS. 5 through 7.

At 1115, the application server may receive, from the client, an indication of a digitally signed version of the digital certificate chain, where the digital certificate chain is signed using a root key associated with the mutual transport layer security service that is trusted by the truest. The operations of 1115 may be performed according to the methods described herein. In some examples, aspects of the operations of 1115 may be performed by a certificate chain component as described with reference to FIGS. 5 through 7.

At 1120, the application server may validate the digitally signed version of the digital certificate chain. The operations of 1120 may be performed according to the methods described herein. In some examples, aspects of the operations of 1120 may be performed by a certificate validation component as described with reference to FIGS. 5 through 7.

At 1125, the application server may transmit, to the client, an indication that the client is authenticated to access the service based on validating the digitally signed version of the digital certificate chain. The operations of 1125 may be performed according to the methods described herein. In some examples, aspects of the operations of 1125 may be performed by an authentication component as described with reference to FIGS. 5 through 7.

Figure 12:
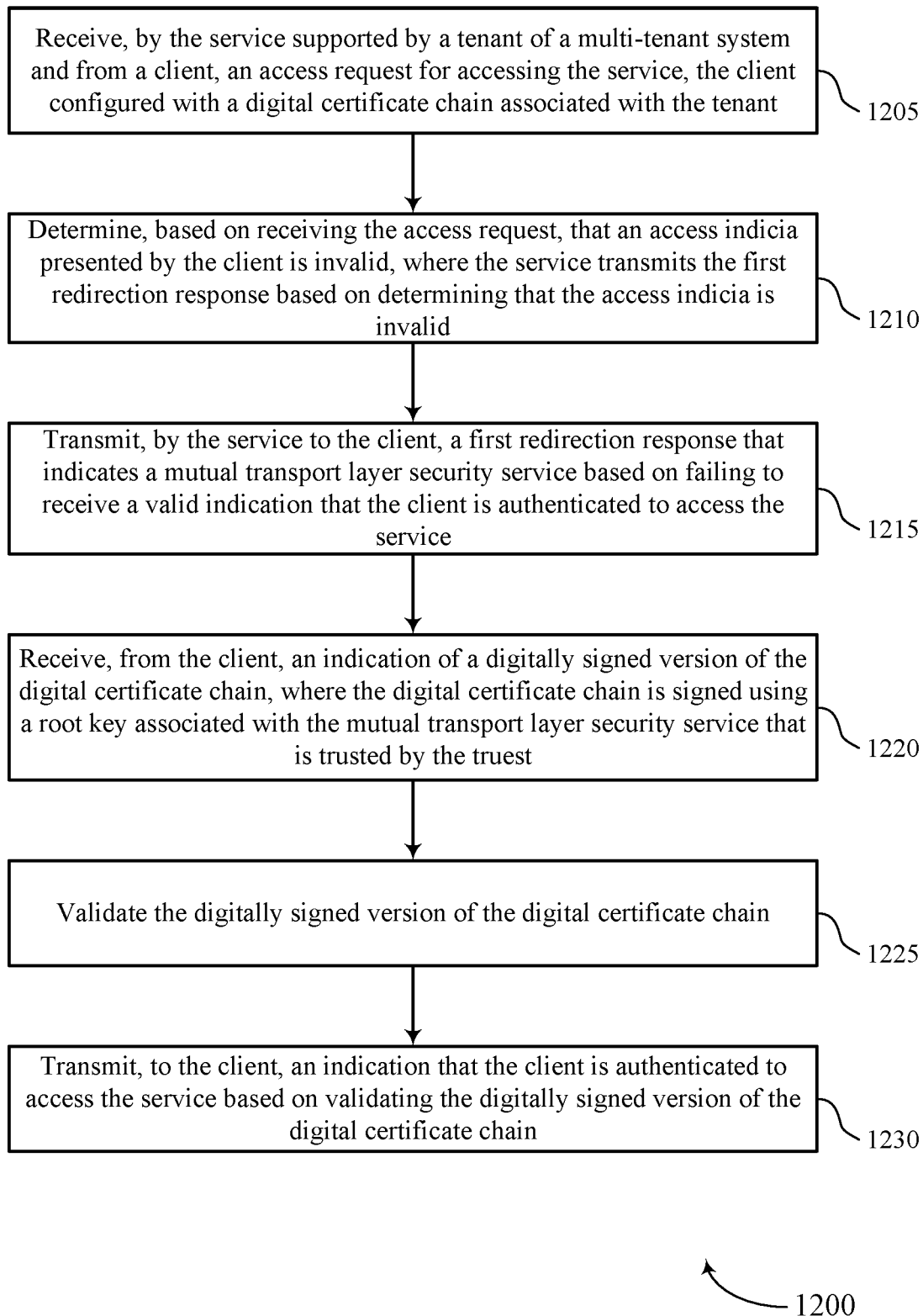

FIG. 12 shows a flowchart illustrating a method 1200 that supports tenant aware mTLS authentication in accordance with aspects of the present disclosure. The operations of method 1200 may be implemented by an application server or its components as described herein. For example, the operations of method 1200 may be performed by a security manager as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1205, the application server may receive, by the service supported by a tenant of a multi-tenant system and from a client, an access request for accessing the service, the client configured with a digital certificate chain associated with the tenant. The operations of 1205 may be performed according to the methods described herein. In some examples, aspects of the operations of 1205 may be performed by an access request interface as described with reference to FIGS. 5 through 7.

At 1210, the application server may determine, based on receiving the access request, that an access indicia presented by the client is invalid, where the service transmits the first redirection response based on determining that the access indicia is invalid. The operations of 1210 may be performed according to the methods described herein. In some examples, aspects of the operations of 1210 may be performed by an access validation component as described with reference to FIGS. 5 through 7.

At 1215, the application server may transmit, by the service to the client, a first redirection response that indicates a mutual transport layer security service based on failing to receive a valid indication that the client is authenticated to access the service. The operations of 1215 may be performed according to the methods described herein. In some examples, aspects of the operations of 1215 may be performed by an access component as described with reference to FIGS. 5 through 7.

At 1220, the application server may receive, from the client, an indication of a digitally signed version of the digital certificate chain, where the digital certificate chain is signed using a root key associated with the mutual transport layer security service that is trusted by the truest. The operations of 1220 may be performed according to the methods described herein. In some examples, aspects of the operations of 1220 may be performed by a certificate chain component as described with reference to FIGS. 5 through 7.

At 1225, the application server may validate the digitally signed version of the digital certificate chain. The operations of 1225 may be performed according to the methods described herein. In some examples, aspects of the operations of 1225 may be performed by a certificate validation component as described with reference to FIGS. 5 through 7.

At 1230, the application server may transmit, to the client, an indication that the client is authenticated to access the service based on validating the digitally signed version of the digital certificate chain. The operations of 1230 may be performed according to the methods described herein. In some examples, aspects of the operations of 1230 may be performed by an authentication component as described with reference to FIGS. 5 through 7.

Figure 13:
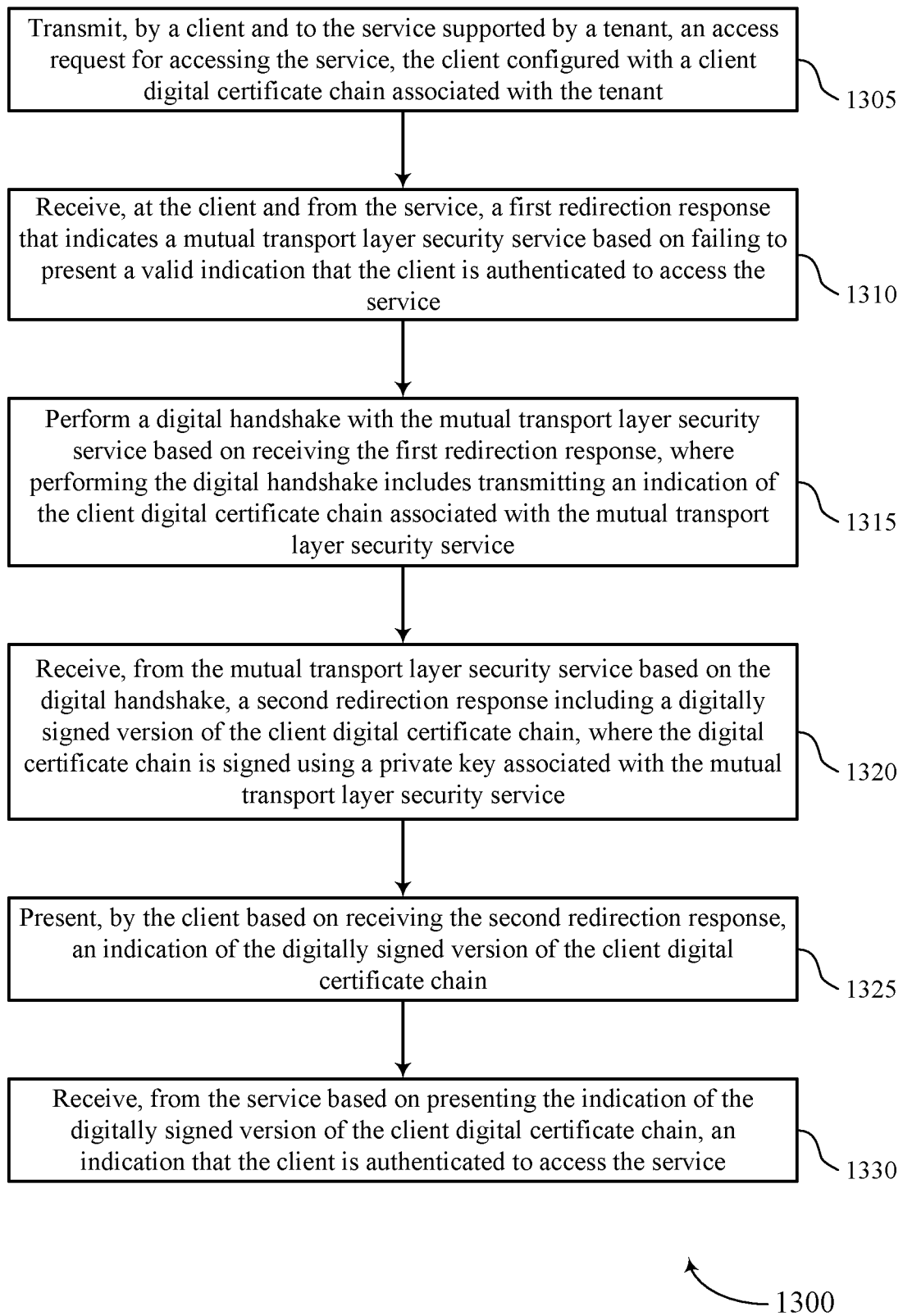

FIG. 13 shows a flowchart illustrating a method 1300 that supports tenant aware mTLS authentication in accordance with aspects of the present disclosure. The operations of method 1300 may be implemented by a user device or its components as described herein. For example, the operations of method 1300 may be performed by a security manager as described with reference to FIGS. 8 through 10. In some examples, a user device may execute a set of instructions to control the functional elements of the user device to perform the functions described herein. Additionally or alternatively, a user device may perform aspects of the functions described herein using special-purpose hardware.

At 1305, the user device may transmit, by a client and to the service supported by a tenant, an access request for accessing the service, the client configured with a client digital certificate chain associated with the tenant. The operations of 1305 may be performed according to the methods described herein. In some examples, aspects of the operations of 1305 may be performed by an access component as described with reference to FIGS. 8 through 10.

At 1310, the user device may receive, at the client and from the service, a first redirection response that indicates a mutual transport layer security service based on failing to present a valid indication that the client is authenticated to access the service. The operations of 1310 may be performed according to the methods described herein. In some examples, aspects of the operations of 1310 may be performed by a redirection component as described with reference to FIGS. 8 through 10.

At 1315, the user device may perform a digital handshake with the mutual transport layer security service based on receiving the first redirection response, where performing the digital handshake includes transmitting an indication of the client digital certificate chain associated with the mutual transport layer security service. The operations of 1315 may be performed according to the methods described herein. In some examples, aspects of the operations of 1315 may be performed by a mTLS component as described with reference to FIGS. 8 through 10.

At 1320, the user device may receive, from the mutual transport layer security service based on the digital handshake, a second redirection response including a digitally signed version of the client digital certificate chain, where the digital certificate chain is signed using a private key associated with the mutual transport layer security service. The operations of 1320 may be performed according to the methods described herein. In some examples, aspects of the operations of 1320 may be performed by a redirection component as described with reference to FIGS. 8 through 10.

At 1325, the user device may present, by the client based on receiving the second redirection response, an indication of the digitally signed version of the client digital certificate chain. The operations of 1325 may be performed according to the methods described herein. In some examples, aspects of the operations of 1325 may be performed by a certificate chain component as described with reference to FIGS. 8 through 10.

At 1330, the user device may receive, from the service based on presenting the indication of the digitally signed version of the client digital certificate chain, an indication that the client is authenticated to access the service. The operations of 1330 may be performed according to the methods described herein. In some examples, aspects of the operations of 1330 may be performed by an authentication component as described with reference to FIGS. 8 through 10.

Figure 14:
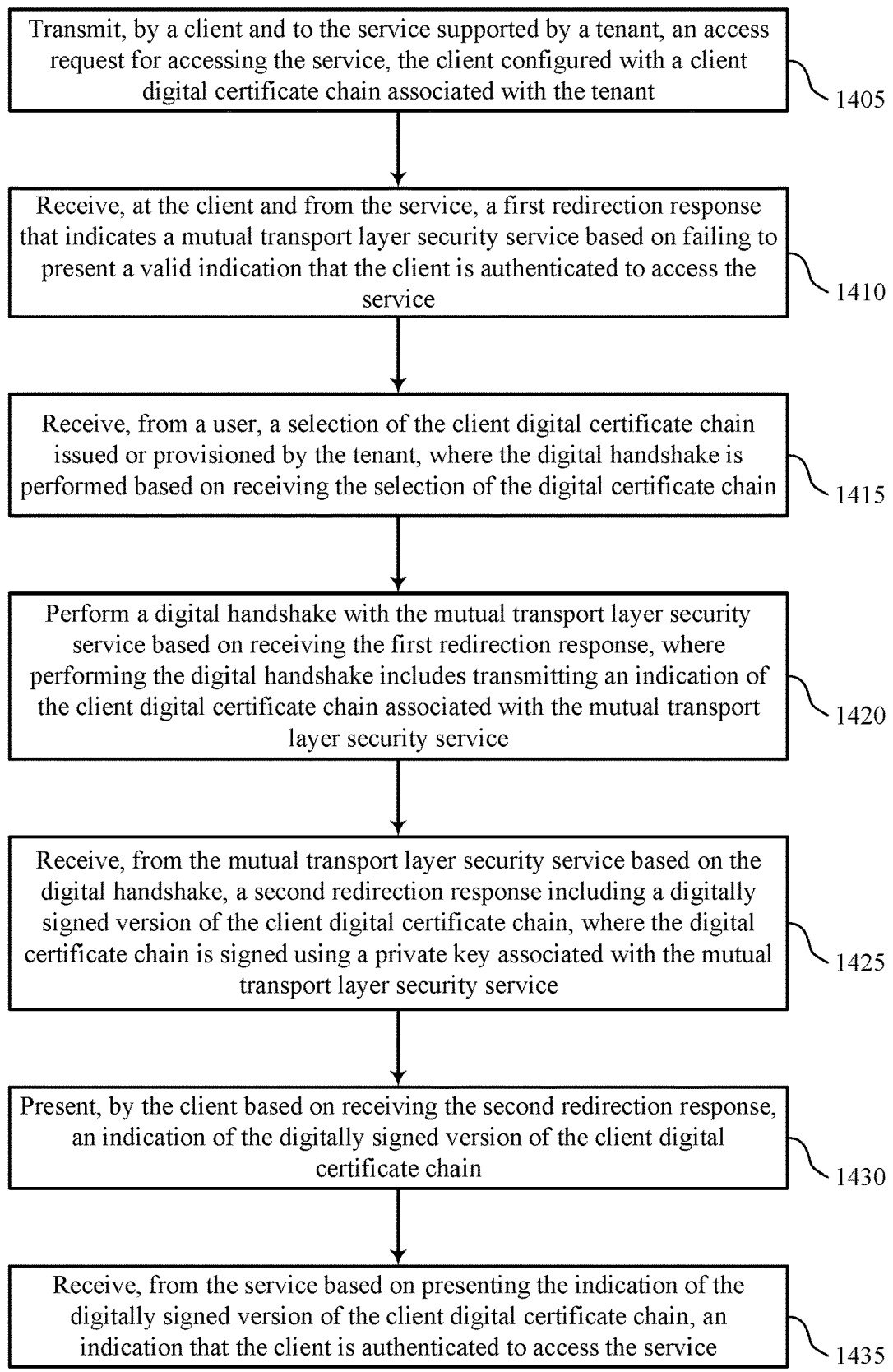

FIG. 14 shows a flowchart illustrating a method 1400 that supports tenant aware mTLS authentication in accordance with aspects of the present disclosure. The operations of method 1400 may be implemented by a user device or its components as described herein. For example, the operations of method 1400 may be performed by a security manager as described with reference to FIGS. 8 through 10. In some examples, a user device may execute a set of instructions to control the functional elements of the user device to perform the functions described herein. Additionally or alternatively, a user device may perform aspects of the functions described herein using special-purpose hardware.

At 1405, the user device may transmit, by a client and to the service supported by a tenant, an access request for accessing the service, the client configured with a client digital certificate chain associated with the tenant. The operations of 1405 may be performed according to the methods described herein. In some examples, aspects of the operations of 1405 may be performed by an access component as described with reference to FIGS. 8 through 10.

At 1410, the user device may receive, at the client and from the service, a first redirection response that indicates a mutual transport layer security service based on failing to present a valid indication that the client is authenticated to access the service. The operations of 1410 may be performed according to the methods described herein. In some examples, aspects of the operations of 1410 may be performed by a redirection component as described with reference to FIGS. 8 through 10.

At 1415, the user device may receive, from a user, a selection of the client digital certificate chain issued or provisioned by the tenant, where the digital handshake is performed based on receiving the selection of the digital certificate chain. The operations of 1415 may be performed according to the methods described herein. In some examples, aspects of the operations of 1415 may be performed by a user interface component as described with reference to FIGS. 8 through 10.

At 1420, the user device may perform a digital handshake with the mutual transport layer security service based on receiving the first redirection response, where performing the digital handshake includes transmitting an indication of the client digital certificate chain associated with the mutual transport layer security service. The operations of 1420 may be performed according to the methods described herein. In some examples, aspects of the operations of 1420 may be performed by a mTLS component as described with reference to FIGS. 8 through 10.

At 1425, the user device may receive, from the mutual transport layer security service based on the digital handshake, a second redirection response including a digitally signed version of the client digital certificate chain, where the digital certificate chain is signed using a private key associated with the mutual transport layer security service. The operations of 1425 may be performed according to the methods described herein. In some examples, aspects of the operations of 1425 may be performed by a redirection component as described with reference to FIGS. 8 through 10.

At 1430, the user device may present, by the client based on receiving the second redirection response, an indication of the digitally signed version of the client digital certificate chain. The operations of 1430 may be performed according to the methods described herein. In some examples, aspects of the operations of 1430 may be performed by a certificate chain component as described with reference to FIGS. 8 through 10.

At 1435, the user device may receive, from the service based on presenting the indication of the digitally signed version of the client digital certificate chain, an indication that the client is authenticated to access the service. The operations of 1435 may be performed according to the methods described herein. In some examples, aspects of the operations of 1435 may be performed by an authentication component as described with reference to FIGS. 8 through 10.

A method of providing access to a service is described. The method may include receiving, by the service supported by a tenant of a multi-tenant system and from a client, an access request for accessing the service, the client configured with a digital certificate chain associated with the tenant, transmitting, by the service to the client, a first redirection response that indicates a mutual transport layer security service based on failing to receive a valid indication that the client is authenticated to access the service, receiving, from the client, an indication of a digitally signed version of the digital certificate chain, where the digital certificate chain is signed using a root key associated with the mutual transport layer security service that is trusted by the truest, validating the digitally signed version of the digital certificate chain, and transmitting, to the client, an indication that the client is authenticated to access the service based on validating the digitally signed version of the digital certificate chain.

An apparatus for providing access to a service is described. The apparatus may include a processor, memory coupled with the processor, and instructions stored in the memory. The instructions may be executable by the processor to cause the apparatus to receive, by the service supported by a tenant of a multi-tenant system and from a client, an access request for accessing the service, the client configured with a digital certificate chain associated with the tenant, transmit, by the service to the client, a first redirection response that indicates a mutual transport layer security service based on failing to receive a valid indication that the client is authenticated to access the service, receive, from the client, an indication of a digitally signed version of the digital certificate chain, where the digital certificate chain is signed using a root key associated with the mutual transport layer security service that is trusted by the truest, validate the digitally signed version of the digital certificate chain, and transmit, to the client, an indication that the client is authenticated to access the service based on validating the digitally signed version of the digital certificate chain.

Another apparatus for providing access to a service is described. The apparatus may include means for receiving, by the service supported by a tenant of a multi-tenant system and from a client, an access request for accessing the service, the client configured with a digital certificate chain associated with the tenant, transmitting, by the service to the client, a first redirection response that indicates a mutual transport layer security service based on failing to receive a valid indication that the client is authenticated to access the service, receiving, from the client, an indication of a digitally signed version of the digital certificate chain, where the digital certificate chain is signed using a root key associated with the mutual transport layer security service that is trusted by the truest, validating the digitally signed version of the digital certificate chain, and transmitting, to the client, an indication that the client is authenticated to access the service based on validating the digitally signed version of the digital certificate chain.

A non-transitory computer-readable medium storing code for providing access to a service is described. The code may include instructions executable by a processor to receive, by the service supported by a tenant of a multi-tenant system and from a client, an access request for accessing the service, the client configured with a digital certificate chain associated with the tenant, transmit, by the service to the client, a first redirection response that indicates a mutual transport layer security service based on failing to receive a valid indication that the client is authenticated to access the service, receive, from the client, an indication of a digitally signed version of the digital certificate chain, where the digital certificate chain is signed using a root key associated with the mutual transport layer security service that is trusted by the truest, validate the digitally signed version of the digital certificate chain, and transmit, to the client, an indication that the client is authenticated to access the service based on validating the digitally signed version of the digital certificate chain.

In some examples of the method, apparatuses, and non-transitory computer-readable medium described herein, validating the digitally signed version of the digital certificate chain may include operations, features, means, or instructions for validating a certificate chain associated with the digitally signed version of the digital certificate chain.

In some examples of the method, apparatuses, and non-transitory computer-readable medium described herein, validating the digitally signed version of the digital certificate chain may include operations, features, means, or instructions for determining that an expiration time associated with the digital certificate chain may be not expired.

Some examples of the method, apparatuses, and non-transitory computer-readable medium described herein may further include operations, features, means, or instructions for determining, based on receiving the access request, that an access indicia presented by the client may be invalid, where the service transmits the first redirection response based on determining that the access indicia may be invalid.

In some examples of the method, apparatuses, and non-transitory computer-readable medium described herein, determining that the access indicia may be invalid may include operations, features, means, or instructions for determining that a time to live value associated with the access indicia may be not expired.

In some examples of the method, apparatuses, and non-transitory computer-readable medium described herein, the access indicia includes a browser cookie, a JSON web token, a HTTP parameter, or a combination thereof.

In some examples of the method, apparatuses, and non-transitory computer-readable medium described herein, transmitting the indication may include operations, features, means, or instructions for storing an access indicia at the client, where the access indicia includes a browser cookie, a JSON web token, a HTTP parameter, or a combination thereof.

In some examples of the method, apparatuses, and non-transitory computer-readable medium described herein, the service may be supported by the tenant of a multi-tenant system that may be associated with the mutual transport layer security service.

In some examples of the method, apparatuses, and non-transitory computer-readable medium described herein, the client digital certificate chain may be associated with the tenant based on the client digital certificate chain being issued by or provisioned by a third party certificate authority.

A method of securely accessing a service is described. The method may include transmitting, by a client and to the service supported by a tenant, an access request for accessing the service, the client configured with a client digital certificate chain associated with the tenant, receiving, at the client and from the service, a first redirection response that indicates a mutual transport layer security service based on failing to present a valid indication that the client is authenticated to access the service, performing a digital handshake with the mutual transport layer security service based on receiving the first redirection response, where performing the digital handshake includes transmitting an indication of the client digital certificate chain associated with the mutual transport layer security service, receiving, from the mutual transport layer security service based on the digital handshake, a second redirection response including a digitally signed version of the client digital certificate chain, where the digital certificate chain is signed using a private key associated with the mutual transport layer security service, presenting, by the client based on receiving the second redirection response, an indication of the digitally signed version of the client digital certificate chain, and receiving, from the service based on presenting the indication of the digitally signed version of the client digital certificate chain, an indication that the client is authenticated to access the service.

An apparatus for securely accessing a service is described. The apparatus may include a processor, memory coupled with the processor, and instructions stored in the memory. The instructions may be executable by the processor to cause the apparatus to transmit, by a client and to the service supported by a tenant, an access request for accessing the service, the client configured with a client digital certificate chain associated with the tenant, receive, at the client and from the service, a first redirection response that indicates a mutual transport layer security service based on failing to present a valid indication that the client is authenticated to access the service, perform a digital handshake with the mutual transport layer security service based on receiving the first redirection response, where performing the digital handshake includes transmitting an indication of the client digital certificate chain associated with the mutual transport layer security service, receive, from the mutual transport layer security service based on the digital handshake, a second redirection response including a digitally signed version of the client digital certificate chain, where the digital certificate chain is signed using a private key associated with the mutual transport layer security service, present, by the client based on receiving the second redirection response, an indication of the digitally signed version of the client digital certificate chain, and receive, from the service based on presenting the indication of the digitally signed version of the client digital certificate chain, an indication that the client is authenticated to access the service.

Another apparatus for securely accessing a service is described. The apparatus may include means for transmitting, by a client and to the service supported by a tenant, an access request for accessing the service, the client configured with a client digital certificate chain associated with the tenant, receiving, at the client and from the service, a first redirection response that indicates a mutual transport layer security service based on failing to present a valid indication that the client is authenticated to access the service, performing a digital handshake with the mutual transport layer security service based on receiving the first redirection response, where performing the digital handshake includes transmitting an indication of the client digital certificate chain associated with the mutual transport layer security service, receiving, from the mutual transport layer security service based on the digital handshake, a second redirection response including a digitally signed version of the client digital certificate chain, where the digital certificate chain is signed using a private key associated with the mutual transport layer security service, presenting, by the client based on receiving the second redirection response, an indication of the digitally signed version of the client digital certificate chain, and receiving, from the service based on presenting the indication of the digitally signed version of the client digital certificate chain, an indication that the client is authenticated to access the service.

A non-transitory computer-readable medium storing code for securely accessing a service is described. The code may include instructions executable by a processor to transmit, by a client and to the service supported by a tenant, an access request for accessing the service, the client configured with a client digital certificate chain associated with the tenant, receive, at the client and from the service, a first redirection response that indicates a mutual transport layer security service based on failing to present a valid indication that the client is authenticated to access the service, perform a digital handshake with the mutual transport layer security service based on receiving the first redirection response, where performing the digital handshake includes transmitting an indication of the client digital certificate chain associated with the mutual transport layer security service, receive, from the mutual transport layer security service based on the digital handshake, a second redirection response including a digitally signed version of the client digital certificate chain, where the digital certificate chain is signed using a private key associated with the mutual transport layer security service, present, by the client based on receiving the second redirection response, an indication of the digitally signed version of the client digital certificate chain, and receive, from the service based on presenting the indication of the digitally signed version of the client digital certificate chain, an indication that the client is authenticated to access the service.

Some examples of the method, apparatuses, and non-transitory computer-readable medium described herein may further include operations, features, means, or instructions for presenting, by the client, an access indicia, where the client receives the first redirection response based on the access indicia being invalid.

In some examples of the method, apparatuses, and non-transitory computer-readable medium described herein, the access indicia may be invalid based on a time to live value being expired.

In some examples of the method, apparatuses, and non-transitory computer-readable medium described herein, receiving the indication that the client may be authenticated may include operations, features, means, or instructions for receiving, from the service, an access indicia, where the access indicia includes a browser cookie, a JSON web token, a HTTP parameter, or a combination thereof.

Some examples of the method, apparatuses, and non-transitory computer-readable medium described herein may further include operations, features, means, or instructions for receiving, from a user, a selection of the client digital certificate chain issued or provisioned by the tenant, where the digital handshake may be performed based on receiving the selection of the digital certificate chain.

In some examples of the method, apparatuses, and non-transitory computer-readable medium described herein, the client digital certificate chain may be associated with the tenant based on the client digital certificate chain being issued by or provisioned by a third party certificate authority.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for providing secure access to a service, comprising:
    receiving, from a client of the service, a request to access the service, wherein the client is configured with a digital certificate chain issued by a certificate authority trusted by the service;
    transmitting, to the client, a response that redirects the client to a mutual transport layer security service trusted by the service based at least in part on determining that the client is unauthorized to access the service;
    receiving, from the client, an indication of a version of the digital certificate chain that is signed by the mutual transport layer security service using a root key associated with the mutual transport layer security service;
    validating that the version of the digital certificate chain provided by the client is signed by the mutual transport layer security service; and
    transmitting, to the client, an indication of a valid access indicia that indicates the client is authorized to access the service based at least in part on validating the version of the digital certificate chain provided by the client.

2. The method of claim 1, wherein validating the version of the digital certificate chain provided by the client comprises:

validating a chain of trust associated with the version of the digital certificate chain signed by the mutual transport layer security service.

3. The method of claim 1, wherein validating the version of the digital certificate chain provided by the client comprises:
  determining that a time to live associated with the version of the digital certificate chain provided by the client is not expired.

4. The method of claim 1, wherein determining that the client is unauthorized to access the service comprises:
  determining, that an access indicia presented by the client is invalid, wherein redirecting the client to the mutual transport layer security service is based at least in part on the client having an invalid access indicia.

5. The method of claim 4, wherein determining that the access indicia is invalid comprises:
  determining that a time to live value associated with the access indicia is expired, wherein the time to live value is configured by a tenant that supports the service.

6. The method of claim 1, wherein the valid access indicia comprises a browser cookie, a JSON web token, a hypertext transfer protocol (HTTP) parameter, or a combination thereof.

7. The method of claim 1, further comprising:
  storing the valid access indicia at the client, wherein the valid access indicia comprises a browser cookie, a JSON web token, a hypertext transfer protocol (HTTP) parameter, or a combination thereof.

8. The method of claim 1, wherein the service is supported by a tenant of a multi-tenant system associated with the mutual transport layer security service.

9. The method of claim 1, wherein the digital certificate chain issued by the certificate authority is associated with a tenant of a multi-tenant system that supports the service.

10. The method of claim 1, wherein:
  the service and the mutual transport layer security service are hosted by separate computing systems;
  the version of the digital certificate chain signed by the mutual transport layer security service is associated with a first time to live value; and
  the valid access indicia provided by the service is associated with a second time to live value that is greater than the first time to live value.

11. A method for securely accessing a service, comprising:
  transmitting, by a client of the service, a request to access the service, wherein the client is configured with a digital certificate chain issued by a certificate authority trusted by the service;
  receiving, from the service, a first response that redirects the client to a mutual transport layer security service trusted by the service;
  performing a digital handshake with the mutual transport layer security service based at least in part on receiving the first response, wherein performing the digital handshake includes transmitting an indication of the digital certificate chain to the mutual transport layer security service;
  receiving, from the mutual transport layer security service and based at least in part on performing the digital handshake, a second response and a version of the digital certificate chain that is signed by the mutual transport layer security service using a root key associated with the mutual transport layer security service, wherein the second response redirects the client back to the service;
  transmitting, to the service and based at least in part on receiving the second response, an indication of the version of the digital certificate chain signed by the mutual transport layer security service; and
  receiving, from the service and based at least in part on transmitting the indication of the version of the digital certificate chain signed by the mutual transport layer security service, an indication of a valid access indicia that indicates the client is authorized to access the service.

12. The method of claim 11, further comprising:
  transmitting an indication of an access indicia to the service, wherein receiving the first response is based at least in part on the access indicia being invalid.

13. The method of claim 12, wherein the access indicia is invalid after a time to live value of the access indicia has expired.

14. The method of claim 11, wherein the valid access indicia comprises a browser cookie, a JSON web token, a hypertext transfer protocol (HTTP) parameter, or a combination thereof.

15. The method of claim 11, further comprising:
  receiving a selection of the digital certificate chain issued by the certificate authority, wherein the digital handshake with the mutual transport layer security service is performed using the selected digital certificate chain.

16. The method of claim 11, wherein the digital certificate chain issued by the certificate authority is associated with a tenant of a multi-tenant system that supports the service.

17. An apparatus for providing secure access to a service, comprising:
  a processor,
  memory coupled with the processor; and
  instructions stored in the memory and executable by the processor to cause the apparatus to:
    receive, from a client of the service, a request to access the service, wherein the client is configured with a digital certificate chain issued by a certificate authority trusted by the service;
    transmit, to the client, a response that redirects the client to a mutual transport layer security service trusted by the service based at least in part on determining that the client is unauthorized to access the service;
    receive, from the client, an indication of a version of the digital certificate chain that is signed by the mutual transport layer security service using a root key associated with the mutual transport layer security service;
    validate that the version of the digital certificate chain provided by the client is signed by the mutual transport layer security service; and
    transmit, to the client, an indication of a valid access indicia that indicates the client is authenticated to access the service based at least in part on validating the version of the digital certificate chain provided by the client.

18. The apparatus of claim 17, wherein the instructions to validate the version of the digital certificate chain provided by the client are executable by the processor to cause the apparatus to:
  validate a chain of trust associated with the version of the digital certificate chain provided by the client.

19. The apparatus of claim 17, wherein the instructions to validate the version of the digital certificate chain provided by the client are executable by the processor to cause the apparatus to:

determine that a time to live associated with the version of the digital certificate chain provided by the client is not expired.

20. The apparatus of claim 17, wherein the instructions to determine that the client is unauthorized to access the service are executable by the processor to cause the apparatus to:
  determine that an access indicia presented by the client is invalid.

* * * * *